United States Patent
Kobayashi et al.

(10) Patent No.: US 7,075,524 B2
(45) Date of Patent: Jul. 11, 2006

(54) COORDINATE INPUT APPARATUS, CONTROL METHOD THEREOF, AND PROGRAM

(75) Inventors: Katsuyuki Kobayashi, Kanagawa (JP); Yuichiro Yoshimura, Kanagawa (JP); Hajime Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 10/620,573

(22) Filed: Jul. 17, 2003

(65) Prior Publication Data
US 2004/0021645 A1 Feb. 5, 2004

(30) Foreign Application Priority Data
Jul. 30, 2002 (JP) .............................. 2002-221820

(51) Int. Cl.
*G09G 5/00* (2006.01)
*G08C 21/00* (2006.01)

(52) U.S. Cl. ...................... 345/173; 345/176; 345/177; 178/18.01; 178/18.04; 178/19.01; 178/19.02

(58) Field of Classification Search ........ 345/173–183; 178/18.01–18.07, 19.01–19.06
See application file for complete search history.

(56) References Cited

U.S. PATENT DOCUMENTS

| | | | |
|---|---|---|---|
| 5,720,021 A * | 2/1998 | Murata et al. .............. 345/581 |
| 6,317,266 B1 * | 11/2001 | Yoshimura et al. ......... 359/619 |
| 6,862,019 B1 * | 3/2005 | Kobayashi et al. ......... 345/173 |
| 6,900,791 B1 * | 5/2005 | Tanaka et al. .............. 345/156 |
| 2002/0130850 A1 | 9/2002 | Kobayashi et al. ......... 345/180 |

FOREIGN PATENT DOCUMENTS

| | | |
|---|---|---|
| JP | 04-299724 | 10/1992 |
| JP | 05-298014 | 11/1993 |
| JP | 10-149253 | 6/1998 |
| JP | 10-333817 | 12/1998 |

* cited by examiner

*Primary Examiner*—Vijay Shankar
(74) *Attorney, Agent, or Firm*—Fitzpatrick, Cella, Harper & Scinto

(57) ABSTRACT

Position coordinates in a space defined by the first to third axes of a coordinate input pointing tool are calculated. A coordinate output form includes at least an absolute coordinate output form in which calculated coordinate values are directly output, and a relative coordinate output form in which the differential values between the calculated coordinate values and predetermined coordinate values are output. The value of the first axis of the calculated coordinate values is compared with a predetermined value. It is determined whether the coordinate values of the second and third axes of the calculated coordinate values fall within a predetermined range. The calculated coordinate values are output in a coordinate output form determined on the basis of the comparison result and determination result.

20 Claims, 15 Drawing Sheets

FIG. 8

| | Pen Operation Mode | | Pen Point SW41 | SW1 42a | SW2 42b | Calculated Coordinate Value | | Output Coordinate Value | |
|---|---|---|---|---|---|---|---|---|---|
| | Pen Up | Pen Down | | | | Z-direction | X- and Y-directions | Absolute Coordinate | Relative Coordinate |
| Pen Input | ○ | | OFF | OFF | OFF | | | — | — |
| | | ○ | ON | — | — | = 0 | Inside Area | ○ | |
| | | | | | | = 0 | Outside Area | NG | NG |
| | | | | | | ≠ 0 | — | NG | NG |
| Proximity Input | ○ | | OFF | ON | OFF | Predetermined Value 1 or Less | Inside Area | ○ | |
| | ○ | | OFF | OFF | ON | Predetermined Value 1 or Less | Outside Area | | ○ |
| | | ○ | OFF | ON | ON | Predetermined Value 1 or Less | Inside Area | ○ | |
| | | ○ | OFF | ON | OFF | Predetermined Value 1 or More | Outside Area | | ○ |
| Remote Input | ○ | | OFF | ON | ON | Predetermined Value 1 or More | — | | ○ |
| | ○ | | OFF | OFF | ON | Predetermined Value 1 or More | — | | ○ |
| | | ○ | OFF | ON | ON | Predetermined Value 1 or More | — | | ○ |

COORDINATE INPUT APPARATUS, CONTROL METHOD THEREOF, AND PROGRAM

FIELD OF THE INVENTION

The present invention relates to a coordinate input apparatus which detects the position coordinates of a coordinate input pointing tool, a control method of the coordinate input apparatus, and a program.

BACKGROUND OF THE INVENTION

Conventionally, apparatuses which can realize a paper-pencil relationship are known, in which a coordinate input apparatus capable of inputting coordinates is placed on the display screen of a display apparatus such as a CRT display, a liquid crystal display (LCD), or a projector so that operator's pointing or handscript by a pointing tool is displayed on the display apparatus.

There are coordinate input apparatuses of a type that uses a transparent input plate, including a resistive film type, an electrostatic type, and an ultrasonic wave type which propagates an ultrasonic wave to a coordinate input surface made of glass or the like. Some coordinate input apparatuses are of an optical type or type which detects a position by radiating a sonic wave into the air. In some coordinate input apparatuses of an electromagnetic induction (electromagnetic transmitting/receiving) type, a mechanism for calculating coordinates is placed behind a display apparatus while a transparent protective plate is placed in front of the display apparatus, thereby constructing an input/output integrated information device.

Such information devices have been used for electronic notepads at first. Along with an increase in the size of display apparatuses, information devices such as a relatively large pen input computer are also becoming popular. Such information devices are combined with wide-screen display apparatuses such as front projectors, rear projectors, or PDPs and used as, e.g., presentation apparatuses or video conference systems. For display apparatuses such as wide-screen liquid crystal displays or PDP displays, image quality improvement and cost reduction are still progressing. As satellite broadcasting and the like are switching to digital broadcasting systems, the specifications and forms of TV sets are also entering a transitory stage.

These wide-screen display apparatuses are replacing, e.g., whiteboards or electronic blackboards used in offices and are used at meetings or briefings by displaying material data that are prepared in personal computers in advance on the wide-screen display apparatuses. In this case, information displayed on the wide-screen display apparatus can be updated by an operator or a participant by directly touching the screen like a whiteboard so that, e.g., the display contents on the display screen can be switched by controlling the personal computer.

In a coordinate input apparatus of this type, particularly, in a coordinate input apparatus of a resistive film type or electrostatic type, however, it is difficult to form a completely transparent input plate, and therefore, the image quality on the display apparatus is low.

In an apparatus of an ultrasonic wave scheme which requires a propagation medium such as a glass plate, the glass surface must be optically processed to prevent, e.g., glare of a fluorescent lamp for indoor use. Hence, if the image quality should be maintained, the cost inevitably largely increases.

In an apparatus of an electromagnetic induction type, an electrode on a matrix is arranged on the lower side of the display screen to transmit/receive an electromagnetic signal to/from a pointing tool. For this reason, when the display apparatus becomes bulky and thick, coordinate calculation is difficult in principle. Additionally, a large-scale coordinate input apparatus for the purpose of conference or presentation is very expensive.

Since a large display system is employed assuming watching by a large audience, a sufficient image view angle and contrast are required. Hence, when such a large display system and coordinate input apparatus are combined, it is important to make it possible to accurately calculate coordinates at a sufficiently low cost and prevent any degradation in image quality of the display apparatus.

When a large input/output integrated system of this type, and briefings assuming many participants or the age of networking are taken into consideration, an arrangement that allows the operator to control an external device such as a personal computer and appropriately display necessary information by directly touching the screen is advantageous for the operator (presenter) from the viewpoint of operability.

In addition, when the operator directly operates information on the screen, listeners as many participants can obtain information such as the point indicated by the operator or the expression or gesture of the operator simultaneously with the information displayed on the screen. This helps better understanding.

However, if the operator directly takes an action to, e.g., indicate a specific position on the display screen of the large display apparatus of this type, information on the screen is hidden by the operator who moves at that time. Especially in a system that employs a display apparatus of a projection type such as a front projector or OHP, the image is greatly distorted, resulting in difficulty to see.

To solve the problem of obstruction on the optical path, the operator may execute an operation like a mouse manipulation (an operation of moving, e.g., a cursor on the basis of not absolute coordinates but relative coordinates) by using a pointing tool to move the cursor from the current position to a desired position.

The method of inputting relative coordinates will be described in detail. Assume that, for example, coordinate values $(X1,Y1)$ are detected at given time by operator's operation, and then, the pointing tool is moved, and the coordinate input apparatus detects coordinate values $(X2, Y2)$. The moving amounts are given by $(\Delta X, \Delta Y)$ $(\Delta X = X2 - X1, \Delta Y = Y2 - Y1)$.

When the cursor is moved on the basis of the moving amounts $(\Delta X, \Delta Y)$, i.e., the moving amounts from the current arbitrary cursor position, the cursor can be moved as the operator's will (the direction and moving distance equal the moving direction and moving amount of the pointing tool). That is, instead of directly locating the pointing tool to a predetermined position on a wide screen, the operator can move the cursor to the predetermined position without changing the position of his/her own.

For the coordinate input apparatus, character input or drawing by directly touching the screen (when the pointing tool is moved, a handscript to the moving position remains as an echo back as if there were a relationship of paper and a pencil) or command generation by double-click on an icon are important functions.

That is, in a system of this type, the operation mode for outputting absolute coordinates is essential. It is important to simultaneously realize this operation and the above-described relative operation.

Various arrangements are disclosed as methods of switching the operation mode. For example, in a method disclosed in Japanese Patent Laid-Open No. 4-299724, the display area is divided into an area where absolute coordinates can be input and an area where relative coordinates can be input. In addition, in methods disclosed in Japanese Patent Laid-Open Nos. 5-298014 and 10-333817, a relative/absolute coordinate switching means is used, or the operation is automatically switched in accordance with the application.

There is also disclosed a method of setting an offset value with respect to absolute coordinates, as disclosed in Japanese Patent Laid-Open No. 10-149253, or a method of processing coordinates in accordance with the moving speed of the pointing tool.

The method of dividing the area and the method of switching the operation mode in accordance with the application presume coordinate detection in the display area and disclose how to process detected coordinates. For example, when absolute point indication is to be executed in the area where relative coordinates can be detected, the set area must be set again, and the area containing the desired point position must be set as the area for absolute coordinate detection. Some setting is required even in the method of switching the operation on the basis of the application. The operation is very cumbersome.

In the arrangement having the switching means or the method of setting an offset amount by a specific operation, the specific operation such as switching occurs in accordance with the application purpose. Such an arrangement is not sufficiently advantageous from the viewpoint of operability. In the method of processing coordinates on the basis of the moving speed of the pointing tool, long-distance movement of a cursor can be realized by a small operation at hand. However, it is very difficult to input a character or draw a graphic pattern.

When a large input/output integrated system of this type, and briefings assuming many participants or the age of networking are taken into consideration, it is necessary not only to cause the operator to control an external device such as a personal computer by "directly touching the screen", as described above. It is also preferable that, e.g., a participant at a conference, who is listening to the presentation while looking at the screen, can operate the screen or obtain information from the network, as needed, even at a "position separated from the screen" to ask a question or disclose evidential materials for a refutation.

In the conventional coordinate input apparatuses represented by apparatuses of a pressure sensitive type or electromagnetic type, the area where coordinates can be input (detected) is smaller than the size of the entire coordinate input apparatus. Hence, when a coordinate input apparatus is placed on a display apparatus such as a liquid crystal display, a range including the display area of the display apparatus and a numerical value that considers a tolerance in attaching the coordinate input apparatus to the display apparatus is generally set as the coordinate input effective area. The size of the display area is set to almost equal to that of the coordinate input effective area.

In other words, when specifications that allow detection outside the display apparatus are satisfied, the size of the coordinate input apparatus increases accordingly. The size of the entire apparatus becomes very large relative to the size of the display area.

SUMMARY OF THE INVENTION

The present invention has been made in consideration of the above situation, and has as its object to provide a coordinate input apparatus which can efficiently and appropriately input coordinates in each of a plurality of input states, a control method of the coordinate input apparatus, and a program.

According to the present invention, the foregoing object is attained by providing a coordinate input apparatus which detects position coordinates of a coordinate input pointing tool, comprising; calculation means for calculating position coordinates in a space defined by first to third axes of the coordinate input pointing tool; comparison means for comparing a value of the first axis of the coordinate values calculated by the calculation means with a predetermined value; determination means for determining whether the coordinate values of the second and third axes of the coordinate values calculated by the calculation means fall within a predetermined range; and output means for outputting the coordinate values calculated by the calculation means in a coordinate output form determined on the basis of a comparison result by the comparison means and a determination result by the determination means, wherein the coordinate output form includes at least an absolute coordinate output form in which the calculated coordinate values are directly output, and a relative coordinate output form in which differential values between the calculated coordinate values and predetermined coordinate values are output.

In a preferred embodiment, the predetermined coordinate values are first effective coordinate values during a continuous input period in which coordinate input is continuously executed, and the apparatus further comprises storage means for storing the first effective position coordinates calculated by the calculation means during the continuous input period as the predetermined coordinate values.

In a preferred embodiment, the apparatus further comprises a display apparatus which is overlapped on the coordinate input apparatus, and the first axis defines a normal direction to a display area plane of the display apparatus, and the second and third axes define the display area plane of the display apparatus.

In a preferred embodiment, the coordinate output form further includes a relative coordinate processing output form in which at least a differential coordinate value between the coordinate value of the second axis and the predetermined coordinate value is multiplied and output.

In a preferred embodiment, the apparatus further comprises a display apparatus which is overlapped on the coordinate input apparatus, and the first axis defines a normal direction to a display area plane of the display apparatus, the second axis defines a horizontal direction of the display area plane of the display apparatus, and the third axis defines a vertical direction of the display area plane of the display apparatus.

In a preferred embodiment, a magnification factor of the multiplication of the differential coordinate value in the relative coordinate processing output form is set on the basis of the coordinate value of the first axis.

In a preferred embodiment, a magnification factor of the multiplication of the differential coordinate value in the relative coordinate processing output form is set on the basis of the position coordinates.

According to the present invention, the foregoing object is attained by providing a coordinate input apparatus which detects position coordinates of a coordinate input pointing tool and displays information based on the position coordinates on a display apparatus, comprising; calculation means for calculating the position coordinates of the coordinate input pointing tool; determination means for determining whether the position coordinates calculated by the calculation means fall within a display area of the display apparatus; and determination means for determining on the basis of a determination result whether the position coordinates or differential coordinate values between the position coordinates and predetermined coordinates should be output.

In a preferred embodiment, further comprising setting means for setting the display area of the display apparatus.

In a preferred embodiment, the setting means sets the display area on the basis of coordinate values of at least three display area corner portions of the display area.

In a preferred embodiment, the apparatus further comprises switch state determination means for determining operative states of a plurality of switches of the coordinate input pointing tool, and the coordinate output control means outputs the position coordinates or the differential coordinate values between the position coordinates and the predetermined coordinates or inhibits output of the position coordinates on the basis of the determination result of the determination means and a determination result of the switch state determination means.

In a preferred embodiment, the predetermined coordinates are first effective coordinate values during a continuous input period in which coordinate input is continuously executed, and the apparatus further comprises storage means for storing the first effective position coordinates calculated by the calculation means during the continuous input period as the predetermined coordinates.

According to the present invention, the foregoing object is attained by providing a control method of a coordinate input apparatus which detects position coordinates of a coordinate input pointing tool, comprising; a calculation step of calculating position coordinates in a space defined by first to third axes of the coordinate input pointing tool; a comparison step of comparing a value of the first axis of the coordinate values calculated in the calculation step with a predetermined value; a determination step of determining whether the coordinate values of the second and third axes, which are calculated in the calculation step, fall within a predetermined range; and an output step of outputting the coordinate values calculated in the calculation step in a coordinate output form determined on the basis of a comparison result in the comparison step and a determination result in the determination step, wherein the coordinate output form includes at least an absolute coordinate output form in which the calculated coordinate values are directly output, and a relative coordinate output form in which differential values between the calculated coordinate values and predetermined coordinate values are output.

According to the present invention, the foregoing object is attained by providing a control method of a coordinate input apparatus which detects position coordinates of a coordinate input pointing tool and displays information based on the position coordinates on a display apparatus, comprising; a calculation step of calculating the position coordinates of the coordinate input pointing tool; a determination step of determining whether the position coordinates calculated in the calculation step fall within a display area of the display apparatus; and a determination step of determining on the basis of a determination result whether the position coordinates or differential coordinate values between the position coordinates and predetermined coordinates should be output.

According to the present invention, the foregoing object is attained by providing a program which causes a computer to function to control a coordinate input apparatus which detects position coordinates of a coordinate input pointing tool, comprising; a program code for a calculation step of calculating position coordinates in a space defined by first to third axes of the coordinate input pointing tool; a program code for a comparison step of comparing a value of the first axis of the coordinate values calculated in the calculation step with a predetermined value; a program code for a determination step of determining whether the coordinate values of the second and third axes, which are calculated in the calculation step, fall within a predetermined range; and a program code for an output step of outputting the coordinate values calculated in the calculation step in a coordinate output form determined on the basis of a comparison result in the comparison step and a determination result in the determination step, wherein the coordinate output form includes at least an absolute coordinate output form in which the calculated coordinate values are directly output, and a relative coordinate output form in which differential values between the calculated coordinate values and predetermined coordinate values are output.

According to the present invention, the foregoing object is attained by providing a program which causes a computer to function to control a coordinate input apparatus which detects position coordinates of a coordinate input pointing tool and displays information based on the position coordinates on a display apparatus, comprising; a program code for a calculation step of calculating the position coordinates of the coordinate input pointing tool; a program code for a determination step of determining whether the position coordinates calculated in the calculation step fall within a display area of the display apparatus; and a program code for a coordinate output control step of outputting the position coordinates or differential coordinate values between the position coordinates and predetermined coordinates on the basis of a determination result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a table for explaining the operation modes of the coordinate input pen according to the first embodiment of the present invention;

DETAILED DESCRIPTION OF THE PREFERRED EMBODIMENTS

The preferred embodiments of the present invention will be described below in detail with reference to the accompanying drawings.

Figure 1:
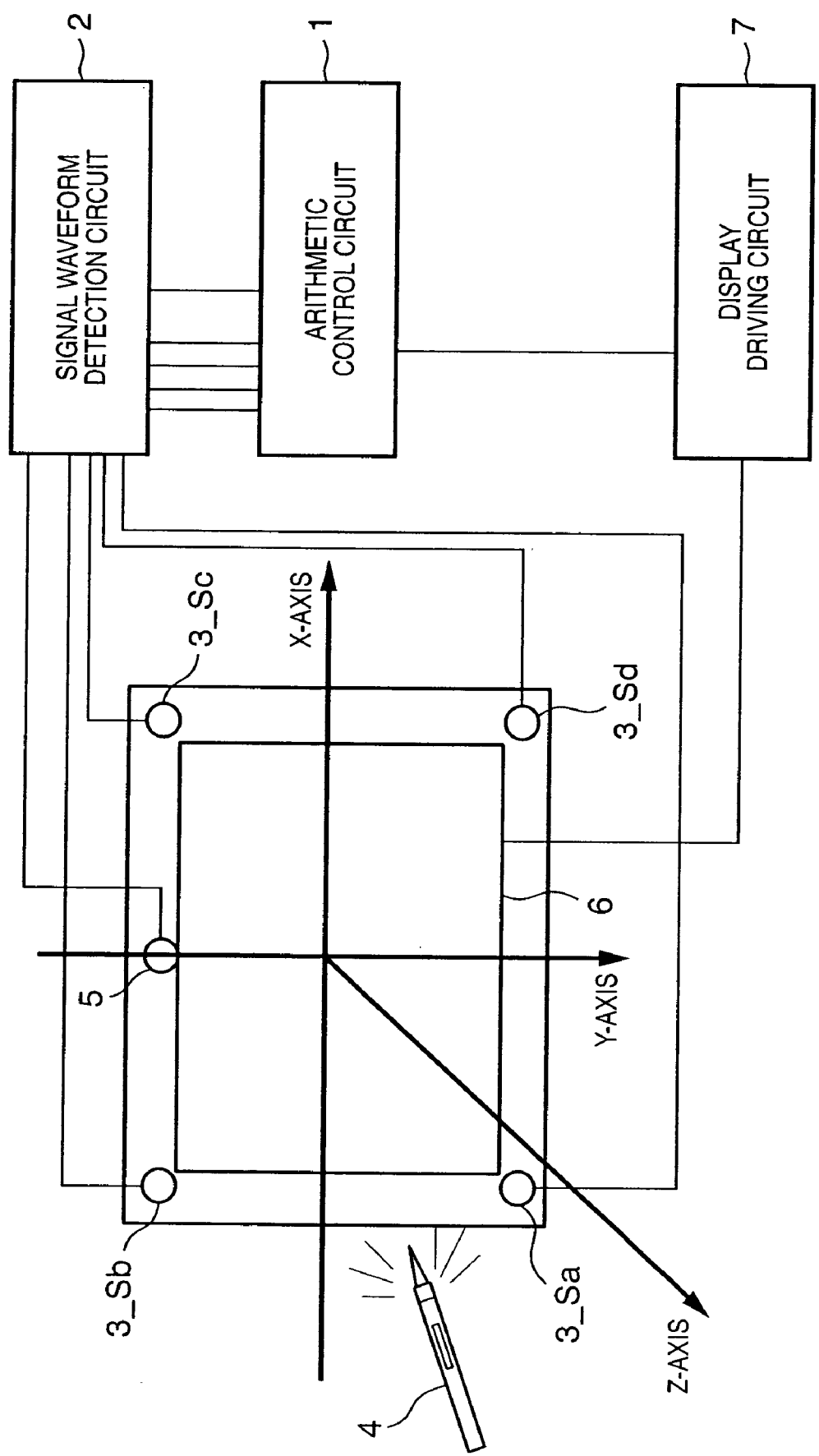
FIG. 1 is a view showing the schematic arrangement of a coordinate input apparatus according to the first embodiment of the present invention, which can measure three-dimensional (spatial) coordinates.

FIG. 1 is a view showing the schematic arrangement of a coordinate input apparatus according to the first embodiment of the present invention, which can measure three-dimensional (spatial) coordinates.

Reference numeral 4 denotes a coordinate input pen serving as a pointing tool. The coordinate input pen 4 is designed to radiate infrared light to transmit ultrasonic wave radiation timings or the switch information of the coordinate input pen 4. The radiated infrared light is received by a photosensor 5. A sonic wave radiated simultaneously is detected a plurality of detection sensors (in the first embodiment, four detection sensors 3_Sa to 3_Sd are used) and processed by a signal waveform detection circuit 2 by a method to be described later. After that, the position (X,Y,Z) of the sonic wave generation source of the coordinate input pen 4 is calculated by an arithmetic control circuit 1.

The arithmetic control circuit 1 is designed to control the coordinate input apparatus and also move a cursor displayed on a display apparatus 6 or display or add handwriting information such as a handwriting on the display apparatus 6 through a display driving circuit 7 on the basis of obtained coordinate data.

When the coordinate input apparatus and display apparatus are combined in the above way, a man-machine interface capable of realizing the relationship of "paper and a pencil" can be provided.

The structure of the coordinate input pen will be described next with reference to FIG. 2.

Figure 2:
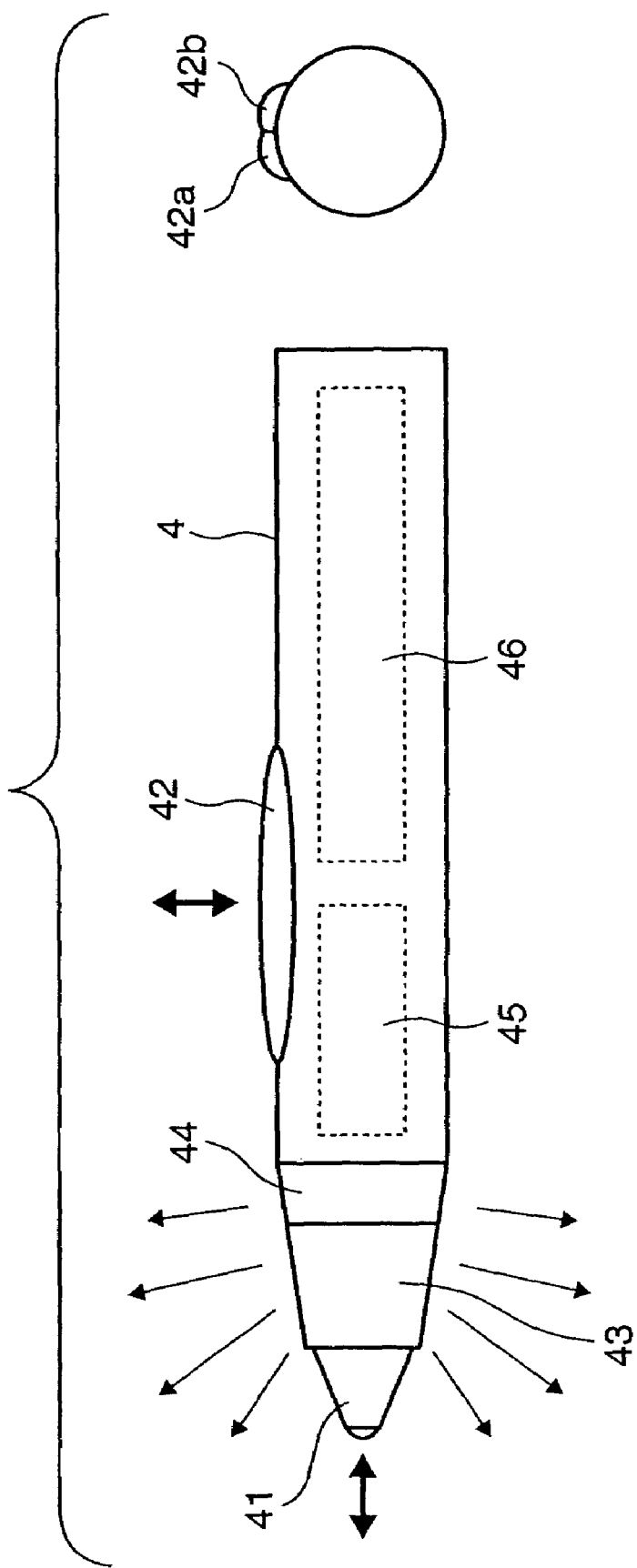
FIG. 2 is a view showing the structure of a coordinate input pen according to the first embodiment of the present invention.

FIG. 2 is a view showing the structure of the coordinate input pen according to the first embodiment of the present invention.

A sonic wave generation source 43 incorporated in the coordinate input pen 4 is driven by a pen power supply 46, a timer, an oscillation circuit, and a driving circuit 45 constituted by a control circuit which executes control by detecting a plurality of pieces of switch information of the coordinate input pen 4 and a memory which stores various kinds of data.

The sonic wave generation source 43 is constituted by a piezoelectric element made of, e.g., PVDF (polyvinylidene fluoride). The PVDF has an annular film shape having a predetermined size and is designed to maximize the driving efficiency at a desired frequency. The driving signal for the sonic wave generation source 43 is a pulse signal which is generated by the timer and has a predetermined repetitive period. The pulse signal is amplified by an oscillation circuit at a predetermined gain and then applied to the sonic wave generation source 43. This electrical driving signal is converted into a mechanical vibration by the sonic wave generation source 43 so that its energy is radiated into the air. On the other hand, when the mechanical vibration energy is radiated from the sonic wave generation source 43, an optical signal is synchronously radiated through a light-emitting portion 44 such as an infrared LED.

The coordinate input pen 4 according to the first embodiment comprises the pen point switch (SW) 41 which operates when the pen point is pressed, and the plurality of pen side switches (SW) 42a and 42b arranged on the housing of the coordinate input pen 4.

The driving circuit 45 outputs the signal that drives the sonic wave generation source 43 in the coordinate input pen 4 at a predetermined period (e.g., every 10 msec; in this case, since a sonic wave is radiated 100 times per sec, the coordinate calculation sampling rate of the coordinate input apparatus is 100 times/sec) so that a sonic wave and an optical signal serving as a timing signal are radiated into the air.

The sonic wave, which arrives at and is detected by the sensors, has delays corresponding to the distances between the sonic wave generation source 43 and the detection sensors 3_Sa to 3_Sd. Each of the detection sensors 3_Sa to 3_Sd is a piezoelectric vibrator formed from PZT which uses a thickness vibration. An acoustic matching layer is formed on the front surface. The acoustic matching layer is made of a thin layer of silicone rubber or the like. The acoustic matching layer can match the acoustic impedance to a gas. When the detection sensor 3 has such a structure, a wide-band characteristic at a high sensitivity can be obtained. In addition, an ultrasonic wave signal can be transmitted/received with a high pulse response.

The coordinate input apparatus of this type basically derives the distance between the sonic wave generation source 43 of the coordinate input pen 4 and each of the detection sensors 3_Sa to 3_Sd on the basis of the product of the known sound velocity of the sonic wave and the arrival time of the sonic wave and geometrically obtains the position information of the sonic wave generation source 43 using the position information of each of the detection sensors 3_Sa to 3_Sd. The arrival time detection method of detecting the arrival time of the sonic wave will be described with reference to FIGS. 3 and 4.

Figure 3:
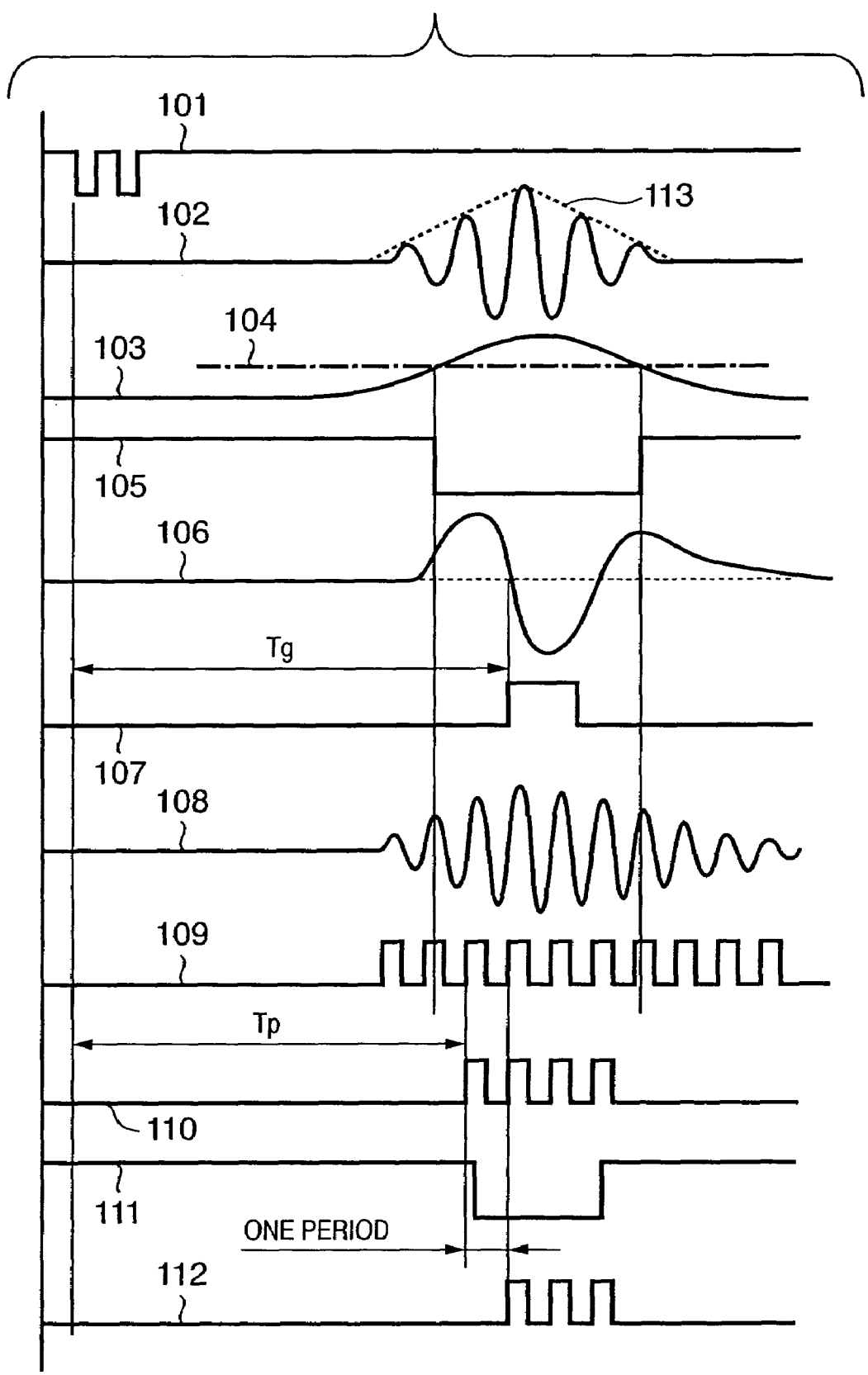
FIG. 3 is a timing chart for explaining a sonic wave arrival time detection method according to the first embodiment of the present invention.
Figure 4:
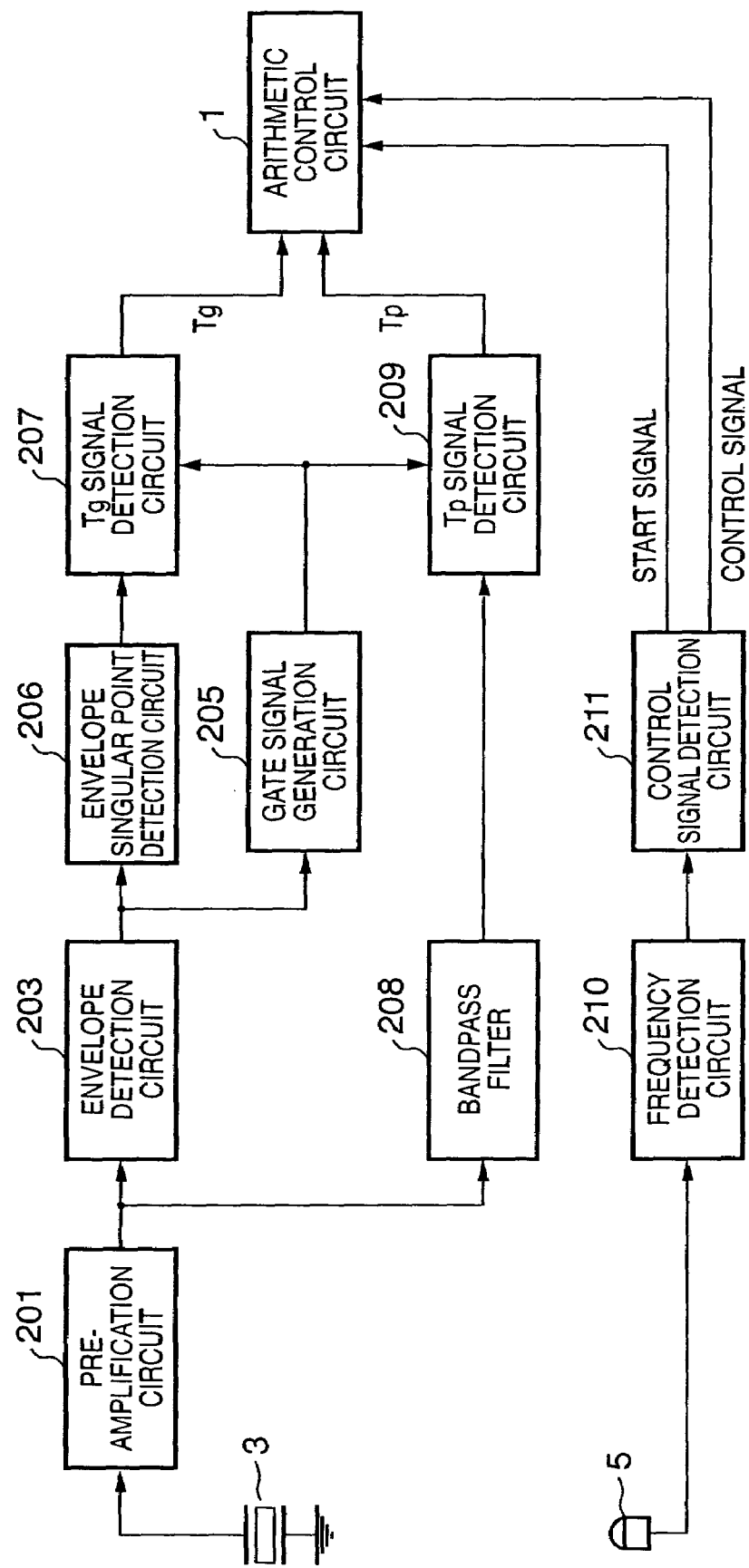
FIG. 4 is a block diagram of a detection circuit which realizes sonic wave arrival time detection according to the first embodiment of the present invention.

FIG. 3 is a timing chart for explaining a sonic wave arrival time detection method according to the first embodiment of the present invention. FIG. 4 is a block diagram of a detection circuit which realizes sonic wave arrival time detection according to the first embodiment of the present invention.

Figure 5:
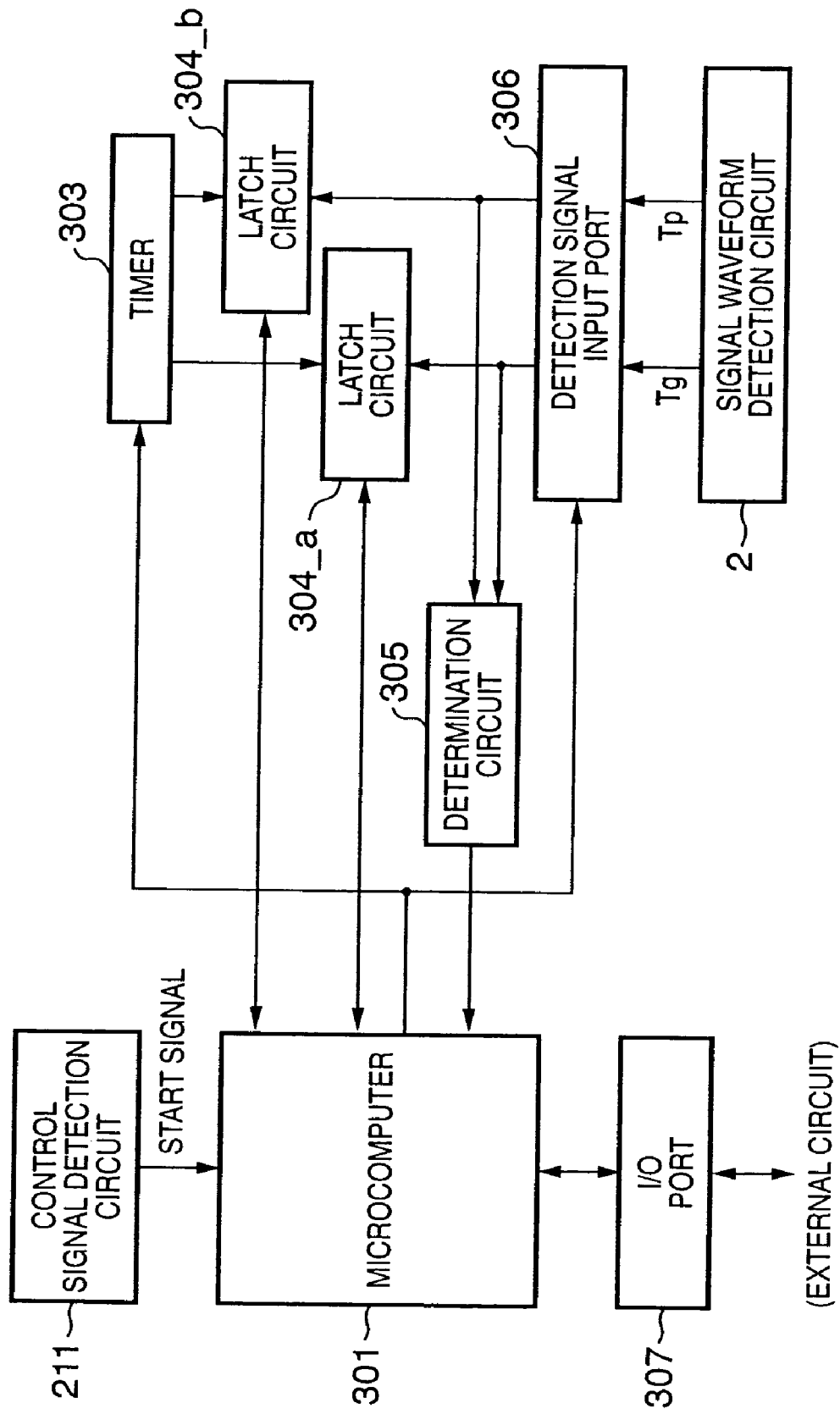
FIG. 5 is a block diagram showing the schematic arrangement of an arithmetic control circuit according to the first embodiment of the present invention.

Reference numeral 101 denotes a driving signal for the sonic wave generation source 43, which is generated by the driving circuit 45. Synchronously, a start signal as an optical signal which transmits the timing information of ultrasonic wave generation from the light-emitting portion 44 is radiated. This optical signal is detected through the photosensor 5. The optical signal transmits to a microcomputer 301 (FIG. 5) in the arithmetic control circuit 1 the ultrasonic wave generation timing or the state (e.g., pen up/down state) of the coordinate input pen 4 through a frequency detection circuit 210 and control signal detection circuit 211 and starts a timer 303 (FIG. 5).

A sonic wave radiated into the air is delayed in accordance with the distances between the sonic wave generation source 43 and the detection sensors 3_Sa to 3_Sd and detected by the detection sensors 3_Sa to 3_Sd. Reference numeral 102 denotes a detection signal detected by the detection sensors 3_Sa to 3_Sd and amplified to a predetermined level by a pre-amplification circuit 201. The detection signal 102 is processed by an envelope detection circuit 203 constituted by an absolute value circuit and a low-pass filter, so an envelope 103 of the detection signal 102 is extracted.

The envelope 103 will be described with an emphasis. The sound velocity of propagation of the waveform is represented by a group velocity Vg. When the singular point of the envelope 103, e.g., the peak of the envelope 103 or the inflection point of the envelope 103 is detected, a delay time tg related to the group velocity Vg is obtained. An envelope singular point detection circuit 206 can easily detect the peak or inflection point of the envelope 103 by using a differentiation circuit and zero-crossing comparator.

Especially, in the first embodiment, second-order differentiation is executed to form a signal 106. The inflection point of the envelope 103 is detected with reference to a gate signal 105 obtained by comparing a threshold level 104 with the envelope 103 (signal 107). When the timer 303 which is continuously executing the count operation is stopped by the signal 107 generated by a Tg signal detection circuit 207, a group delay time Tg related to the group velocity Vg can be detected.

Strictly speaking, the group delay time Tg contains the delay component of the circuit related to waveform processing. However, its influence is completely removed by a method to be described later. For the sake of simplicity, a description will be made here assuming that no circuit delay time is present.

A distance L between the sonic wave generation source 43 and each of the detection sensors 3_Sa to 3_Sd can be obtained by $$L = Vg \times Tg \quad (1)$$

To more accurately calculate the distance L, the sonic wave arrival time is derived from the phase information of the detection signal waveform. This will be described in detail. An extra frequency component of the output signal 103 from the detection sensors 3_Sa to 3_Sd is removed by a bandpass filter 208. Then, the signal 103 is input to a Tp signal detection circuit 209. The Tp signal detection circuit 209 is constituted by a zero-crossing comparator and multivibrator. A signal 109 related to the zero-crossing point of a signal 108 output from the bandpass filter 208 is produced.

The signal 109 is further compared with the gate signal 105 produced by a gate signal generation circuit 205 which compares the detection signal with the predetermined threshold level 104, thereby producing a signal 110 which outputs the first zero-crossing point where the phase of the signal waveform output from the bandpass filter 208 crosses from, e.g., the negative side to the positive side in the period of the signal 105. In a similar way, when the timer 303 which is operated by the above-described start signal is stopped using the signal 110, a phase delay time Tp related to a phase velocity Vp can be detected.

Strictly speaking, the phase delay time Tp contains the delay component of the circuit related to waveform processing. However, its influence is completely removed by a method to be described later. For the sake of simplicity, a description will be made here assuming that no circuit delay time is present.

The signal level detected by the detection sensors 3_Sa to 3_Sd varies depending on the following factors.

1) The electromechanical conversion efficiency of the sonic wave generation source 43 and detection sensors 3_Sa to 3_Sd 2) The distances between the sonic wave generation source 43 and the detection sensors 3_Sa to 3_Sd 3) Environmental variations in temperature and humidity of the air through which the sonic wave propagates 4) The directivity of sonic wave radiation by the sonic wave generation source 43, and sensitive directivity of the detection sensors 3_Sa to 3_Sd Item 1) is a factor generated by component tolerance and must sufficiently be taken into consideration in mass production of apparatuses. Item 2) is related to attenuation of a sonic wave. As is generally well known, the signal level of a sonic wave that propagates through the air exponentially attenuates as the distances between the sonic wave generation source 43 and the detection sensors 3_Sa to 3_Sd increase. The attenuation constant changes depending on the environment represented by item 3).

For item 4), since the present invention operates as a coordinate input apparatus, the posture of the coordinate input pen 4 serving as a writing instrument always changes, i.e., the pen holding angle varies depending on the writing operation of the operator. The level largely changes depending on this variation. In addition, even when the angles made by the coordinate input pen 4 and the detection sensors 3_Sa to 3_Sd vary, the detection level varies because of the sensitive directivity of the detection sensors 3_Sa to 3_Sd.

For example, assume that the detection level becomes lower. In this case, since the above-described threshold level (e.g., the signal 104) is fixed, the gate generation period may be shortened (signal 111). For example, the signal 110 may change to a signal 112 at a high probability due to the decrease in signal level.

In addition, since the time difference between the signals 110 and 112 corresponds to an integer multiple of the phase period (in FIG. 3, one period) of the signal 108. An equation to be used to obtain the distance using the phase delay time Tp is given by $$L = Vp \times Tp + n \times \lambda p \quad (2)$$

where $\lambda p$ ($= Vp \times T = Vp/f$: f is the frequency) is the wavelength of the wave, and n is an integer.

However, the integer n can be obtained from equations (1) and (2) as $$n = Int[(Vg \times Tg - Vp \times Tp)/\lambda p + 0.5] \quad (3)$$

When the value of the integer n is substituted into equation (2), the distance L can be accurately derived.

The schematic arrangement of the arithmetic control circuit 1 according to the first embodiment will be described next with reference to FIG. 5.

FIG. 5 is a block diagram showing the schematic arrangement of the arithmetic control circuit 1 according to the first embodiment of the present invention.

The microcomputer 301 controls the arithmetic control circuit 1 and the entire coordinate input apparatus itself. The microcomputer 301 is constituted by an internal counter, a ROM which stores operation procedures, a RAM to be used for calculation and the like, and a nonvolatile memory which stores constants and the like. As described above, a start signal which synchronizes with the driving timing of the sonic wave generation source 43 in the coordinate input pen 4 is generated by the driving circuit 45 and radiated through the light-emitting portion 44 incorporated in the coordinate input pen 4 as an optical signal. When the signal is detected by the control signal detection circuit 211, the timer 303 (constituted by, e.g., a counter) in the arithmetic control circuit 1 starts.

With this arrangement, the driving timing of the sonic wave generation source 43 in the coordinate input pen 4 can be synchronized with the timer 303 in the arithmetic control circuit 1. For this reason, the time required for the sonic wave generated by the sonic wave generation source 43 to arrive at each of the detection sensors 3_Sa to 3_Sd can be measured.

Vibration arrival timing signals (signals 107, or for more accurate detection, signals 110) from the detection sensors 3_Sa to 3_Sd, which are output from the signal waveform detection circuit 2, are input to a latch circuits 304_a (for Tg signal processing) and 304_b (for Tp signal processing) through a detection signal input port 306. The latch circuits 304_a and 304_b receive the vibration arrival timing signals from the detection sensors 3_Sa to 3_Sd and latch the count value of the timer 303 at that time.

A determination circuit 305 determines that all detection signals necessary for coordinate detection have thus been received, and outputs a signal representing it to the microcomputer 301. Upon receiving the signal from the determination circuit 305, the microcomputer 301 reads the vibration arrival times to the detection sensors 3_Sa to 3_Sd from the latch circuits 304_a and 304_b, and executes predetermined calculation to obtain the coordinate position of the coordinate input pen 4.

Although only latch circuits corresponding one detection sensor are illustrated in FIG. 5, actually, latch circuits corresponding to the number of detection sensors are appropriately arranged.

When the coordinate values (absolute coordinate values) obtained as the calculation result is output to the display driving circuit 7 through an I/O port 307, for examples, dots can be displayed at a corresponding position on the display apparatus 6. When the coordinate position information or the state signal (pen up/down state or pen ID) of the coordinate input pen 4 is output to an interface circuit (not shown) through the I/O port 307, the coordinate values or control signal can be output to an external device.

In the first embodiment, the detected time contains an electrical processing time by the circuits and the like in addition to the sonic wave arrival times from the sonic wave generation source 43 to the detection sensors 3_Sa to 3_Sd. A method of removing an extra measurement time other than the sonic wave propagation time will be described here.

The group delay time Tg and phase delay time Tp latched by the latch circuits 304_a and 304_b contain a group circuit delay time etg and phase circuit delay time etp, respectively. Each circuit delay time always contains a constant value in every time measurement. Let t* be the time measured by a given measurement circuit in propagation between the sonic wave generation source 43 and the detection sensor 3, e be the circuit delay time in the measurement circuit, and t be the actual time necessary for the sonic wave for propagating between the sonic wave generation source 43 and the detection sensor 3. The time t* is given by $$t^* = t + e \tag{4}$$

Let tini* be the time measurement value when the distance between the sonic wave generation source 43 and the detection sensor 3 is a known distance Lini, e be the circuit delay time in the measurement circuit, and tini be the actual sonic wave propagation time. The time tini* is given by $$tini^* = tini + e \tag{5}$$

Hence, $$t^* - tini^* = t - tini \tag{6}$$

Letting V be the sound velocity of the sonic wave, we obtain $$V \times (t^* - tini^*) = V \times (t - tini) = V \times t - Lini \tag{7}$$

Hence, the arbitrary to-be-calculated distance L between the sonic wave generation source 43 and the detection sensor 3 is given by $$L = V \times t = V \times (t^* - tini^*) + Lini \tag{8}$$

When the above-described known distance Lini and the time measurement value tini* for that distance (a phase delay time Tpini* or a group delay time Tgini* and phase delay time Tpini*) are stored in the nonvolatile memory of the arithmetic control circuit 1 at the time of shipping or reset, an arbitrary distance between the sonic wave generation source 43 and the detection sensor 3 can be accurately calculated.

Figure 6:
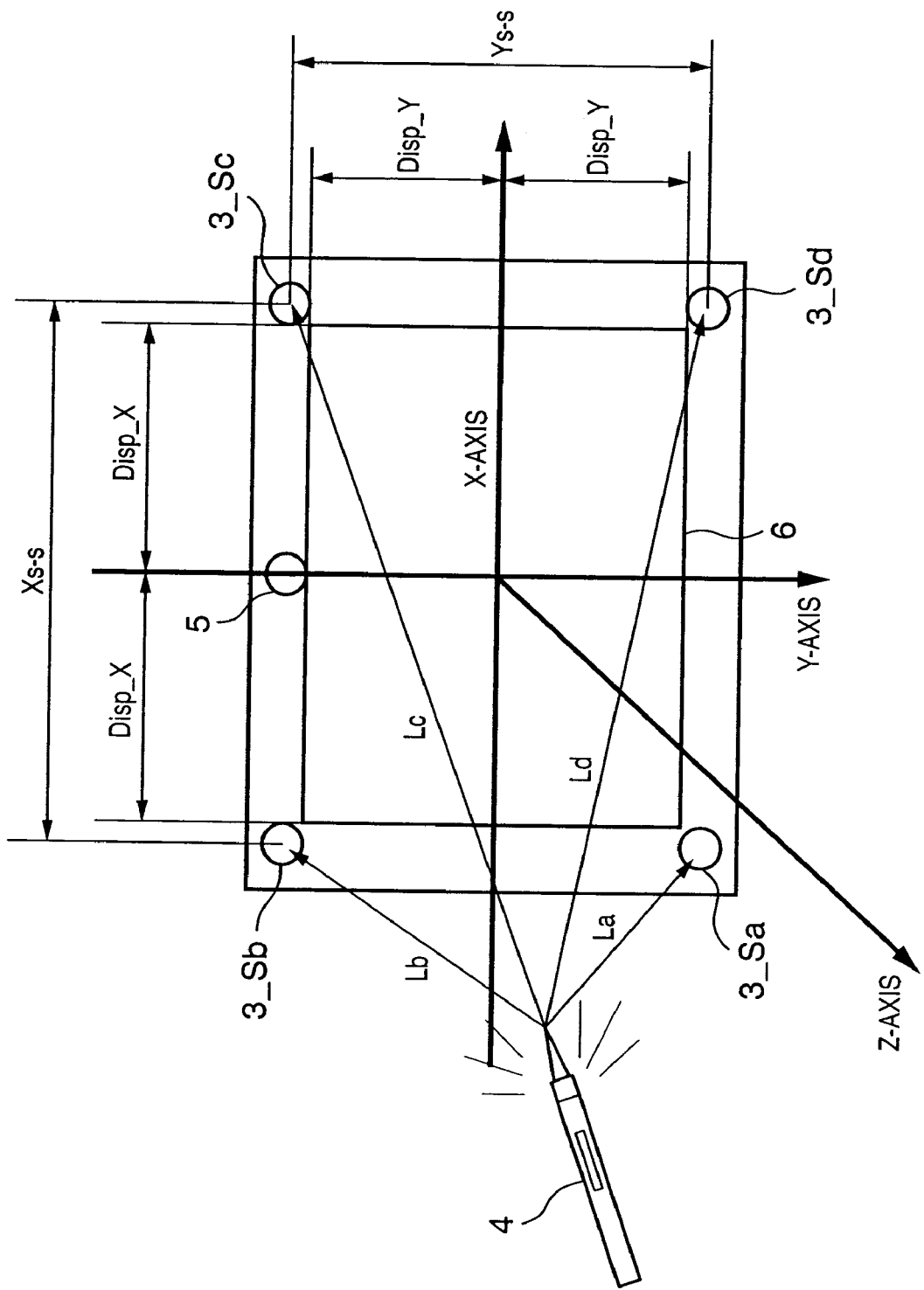
FIG. 6 is a view for explaining a coordinate system according to the first embodiment of the present invention.

A method of obtaining the position coordinates (X,Y,Z) of the sonic wave generation source 43 when the detection sensors 3_Sa to 3_Sd are arranged in the coordinate system as shown in FIG. 6 will be described next.

In the spatial coordinates that define the position coordinates (X,Y,Z) of the sonic wave generation source 43, the Z-axis defines the normal direction to the display plane of the display apparatus 6, and the X- and Y-axes define the display plane of the display apparatus 6.

In the second embodiment to be described later, the Z-axis defines the normal direction to the display plane of the display apparatus 6, the X-axis defines the horizontal direction of the display plane of the display apparatus 6, and Y-axis defines the vertical direction of the display plane of the display apparatus 6.

Let La to Ld be the distances between the sonic wave generation source 43 and the detection sensors 3_Sa to 3_Sd, which are accurately obtained by the above method, Xs-s be the distance between the detection sensors in the X direction, and Ys-s be the distance between the detection sensors in the Y direction. Then, $$Lb^2 - \left(\frac{Xs-s}{2} + x\right)^2 = Lc^2 - \left(\frac{Xs-s}{2} + x\right)^2 \tag{9}$$

$$x = \frac{Lb^2 - Lc^2}{2Xs-s} \tag{10}$$

Similarly, $$y = \frac{Lb^2 - La^2}{2Ys-s} \tag{11}$$

-continued $$z = \sqrt{Lb^2 - \left(\frac{Xs-s}{2}+x\right)^2 - \left(\frac{Ys-s}{2}+y\right)^2} \quad (12)$$

As described above, when the distances between at least three detection sensors 3 and the sonic wave generation source 43 are measured, the position (spatial) coordinates of the sonic wave generation source 43 can easily be obtained. In the present invention, four detection sensors 3 are used. For example, the distance information of the farthest detection sensor is not used (in this case, the signal output from the detection sensor 3 has the lowest signal level because the distance is largest). Coordinates are calculated using only the remaining three pieces of distance information, thereby reliably calculating the coordinates.

When the distance information of the farthest detection sensor is used, it can be determined whether the reliability of the output coordinate values is high.

As a detailed method, for example, the coordinate values calculated using the pieces of distance information La, Lb, and Lc are equal to the coordinate values calculated using the pieces of distance information Lb, Lc, and Ld (calculation is done while changing the combination of distance information). However, if the coordinate values do not coincide, any of the pieces of distance information is incorrect. That is, a detection error has occurred. In this case, the reliability may be increased by inhibiting output of the coordinate values.

The operation modes of the coordinate input apparatus of the present invention, which can calculate the spatial coordinates, will be described next.

The coordinate input pen 4 according to the present invention comprises the pen point switch 41 and the two pen side SWs 42*a* and 42*b*, as shown in FIG. 2. The operation modes of the SWs will be described with reference to FIGS. 7 and 8. In addition, the operation modes on the detection circuit side (main body side) corresponding to the operation modes of the coordinate input pen 4 will be described with reference to FIGS. 8 and 9.

Figure 7:
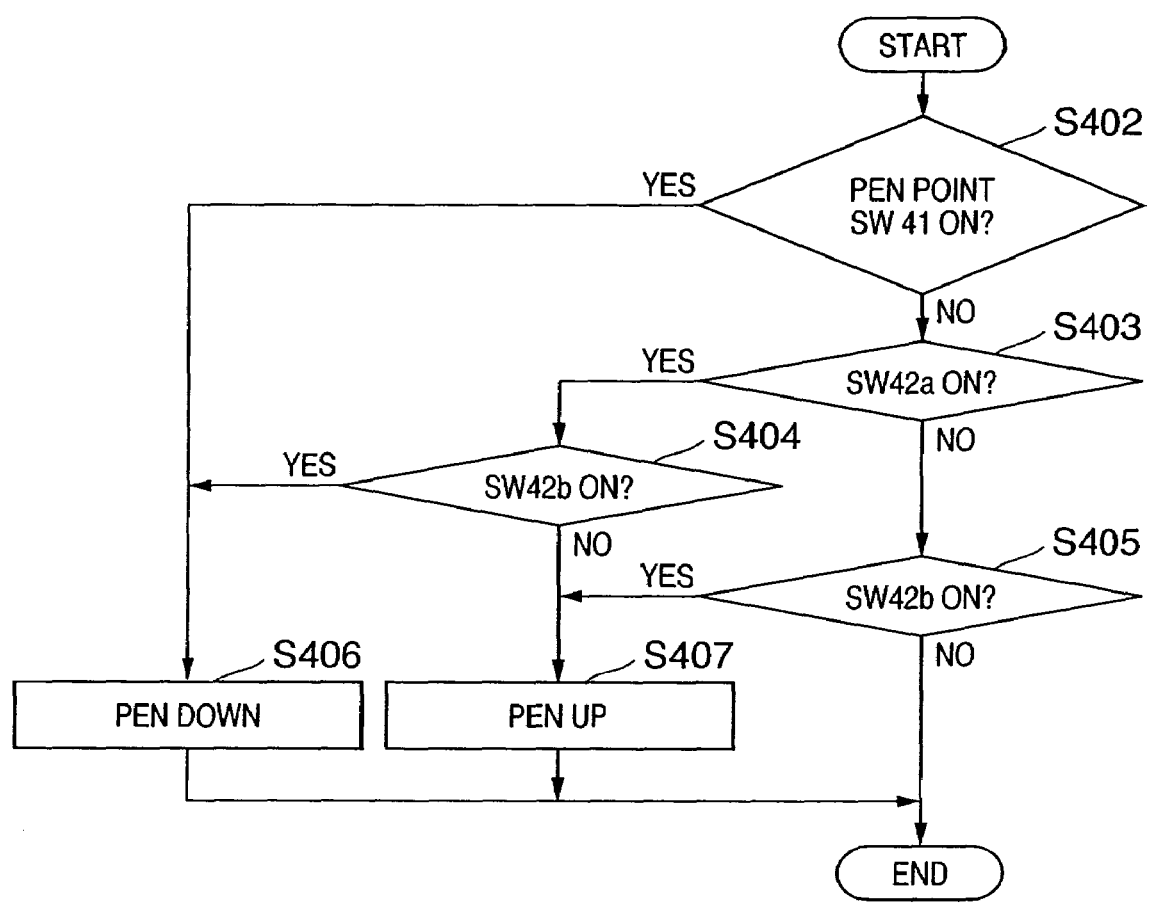
FIG. 7 is a flow chart for explaining the operation of the coordinate input pen according to the first embodiment of the present invention.

FIG. 7 is a flow chart for explaining the operation of the coordinate input pen according to the first embodiment of the present invention. FIG. 8 is a table for explaining the operation modes of the coordinate input pen according to the first embodiment of the present invention.

An operation program which executes processing shown in FIG. 7 in accordance with the operation mode shown in FIG. 8 is stored in the memory in the driving circuit 45 shown in FIG. 2. The control circuit (CPU) in the driving circuit 45 executes the operation program in accordance with the operations of the pen point SW 41 and pen side SWs 42*a* and 42*b*.

In the following description, input by the operation of the pen point SW 41 will be referred to as "pen input". Coordinate input operation which is performed relatively near the display apparatus 6 when the pen point SW 41 is not in a direct contact with the surface of the display apparatus 6, i.e., the pen point SW 41 does not operate will be referred to as "proximity input". Coordinate input operation which is performed at a position separated from the display apparatus 6 will be referred to as "remote input".

When the operator holds the coordinate input pen 4 and presses the coordinate input surface, the pen point SW 41 operates. First, in step S402, it is determined whether the pen point SW 41 is ON. If the pen point SW 41 is not ON (NO in step S402), the flow advances to step S403. If the pen point SW 41 is ON (YES in step S402), the flow advances to step S406 to cause the driving circuit 45 to operate the sonic wave generation source 43 at a first predetermined period (e.g., 50 times/sec) such that a sonic wave (first control signal) is radiated into the air at the first predetermined period. The coordinate values calculated by the coordinate input apparatus of the present invention at this time are absolute coordinate values (X,Y,0). When the values are directly output to an external device or the like, the operator can perform writing operation (pen down state).

When the coordinate values detected at this time are coordinate values within the display area (in FIG. 6, x<±Disp_X, y<±Disp_Y), a locus corresponding to the movement of the pointing tool is output to the display screen like the normal paper-pencil relationship.

When the detected coordinate values fall outside the display area, although the pen point SW 41 is operating, the pen point SW 41 may be being operated unconsciously by the operator's hand. In this case, coordinate output is inhibited. Similarly, the state wherein the pen point SW 41 is operating corresponds to the state wherein the coordinate input pen 4 is pressing the display screen as the coordinate input surface. The Z-coordinate value detected at this time should be almost "0". If this value is not "0", the operator may be performing erroneous operation. In this case as well, coordinate output is inhibited.

On the other hand, when the pen point SW 41 is in the OFF state, no writing operation is being performed by causing the operator to press the coordinate input surface. However, it is very advantageous to, e.g., move the displayed cursor or execute desired screen operation by double-clicking on an icon near the coordinate input surface, or at a position separated from the display apparatus 6 serving as the coordinate input surface or outside the display area of the display apparatus 6.

For this purpose, a sonic wave is radiated into the air by pressing one of the pen side SWs 42*a* and 42*b* to allow cursor movement or the like (pen up state). The coordinate input pen is designed to set the pen down state by pressing both the pen side SWs 42*a* and 42*b* even when the pen point SW 41 is not operating.

The processing will be described below.

When the pen point SW 41 is not ON (NO in step S402), i.e., when the pen point SW 41 is OFF, it means at least a state wherein coordinate input on the X-Y plane (Z=0) by the operator is not executed. Even in this case, it is preferably possible to execute operation of, e.g., moving the cursor displayed on the screen (pen up state). To implement this operation, the coordinate input pen 4 of the present invention has the pen side SWs 42*a* and 42*b*.

In steps S403 to S405, it is determined whether the pen side SW 42*a* or 42*b* is ON. On the basis of the determination result, when at least one of the pen side SWs is ON, the flow advances to step S407 to radiate a sonic wave (second control signal) into the air at a second predetermined period (e.g., 40 times/sec) (pen up state).

Even at a position separated from the input surface (Z>0), if the operator wants to move the cursor by moving the coordinate input pen 4 and leave the moving state as a record (handscript), he/she presses both the pen side SWs 42*a* and 42*b*. Then, the flow advances to step S406 to radiate a sonic wave (first control signal) into the air at the first predetermined period to set the pen down state.

In the above description, the pen up/down information is detected by measuring the ultrasonic wave radiation period (measuring/determining whether the period is 50 times/sec or 40 times/sec). However, the present invention is not limited to this.

For example, the information may be superposed on the above-described start timing signal (in the first embodiment, the optical signal by the light-emitting portion 44 incorporated in the coordinate input pen 4), detected by the control signal detection circuit 211, and output to the arithmetic control circuit 1.

Alternatively, for example, the frequency of the sonic wave to be radiated is changed in accordance with the states of the switches of the coordinate input pen 4 and detected, thereby determining the operation mode.

As shown in FIG. 2, the pen side SWs 42a and 42b are arranged at an angle of about 90° in the direction of the section of the coordinate input pen 4. The positions of the switches are set such that when the operator holds the coordinate input pen, his/her thumb naturally comes into contact with one pen side SW and his/her index finger comes into contact with the other pen side SW independently of the dominant hand.

The pen side SWs 42a and 42b are arranged in this way. In addition, an operation mode (in the first embodiment, the pen up state) set when one of the pen side SWs is turned on and an operation mode (pen down state) set only when both pen side SWs are in the ON state are set. With this arrangement, a convenient coordinate input pen 4 can be formed independently of the dominant hand.

As another embodiment of the pen side SWs 42a and 42b, a two-stroke switch which switches two modes by a single switch can also be effectively used. More specifically, at the first stroke, the first switch operates (pen up state), and at the second stroke, the second switch operates (pen down state). Even in this case, a convenient coordinate input pen 4 can be formed independently of the dominant hand.

A method of inputting coordinates, moving the cursor (pen up state), or writing (pen down state) at a position separated from the display screen of the display apparatus 6 by operating the pen side SWs 42a and 42b has been described above. In this case (when the pen point SW 41 is not in direct contact with the surface of the display apparatus 6, i.e., the pen point SW 41 is not operating), specifications required from the viewpoint of operation change between a case wherein the pen point SW 41 is operated on the display screen of the display apparatus 6 or near the display screen (a state wherein the pen point SW 41 is located in the space near the display screen and is not operating) and a case wherein the coordinate input operation is performed at a position separated from the display screen or outside the display area.

In the former case, it is required to intuitively and directly accurately move, e.g., the displayed cursor to a desired position by moving the coordinate input pen 4. In the latter case, it is required to move, e.g., the displayed cursor to a desired position by relatively moving the cursor in accordance with the movement of the coordinate input pen 4.

That is, when the operator wants to make a presentation using a large display, it is preferable to use a means (with the paper-pencil relationship) for making it possible to control display information or write information (characters or graphic patterns) by directly touching the screen (inputting coordinates).

In addition, when the operator wants to simply indicate information, instead of causing the operator to go to the screen to indicate the information, it is preferable to make it possible to execute desired screen control or add information at a separate position, i.e., without causing the operator to hide the displayed information viewed from the listeners.

When a large input/output integrated system of this type and briefings assuming many participants are taken into consideration, it is preferable not only to cause the operator to control an external device such as a personal computer by directly touching the screen, as described above. It is also preferable that, e.g., a participant at a conference, who is listening to the presentation while looking at the screen, can operate the screen or obtain information from the network, as needed, even at a position separated from the screen to ask a question or disclose evidential materials for a refutation.

The present invention has been made in consideration of this point. The coordinate input apparatus of the present invention determines, on the basis of detected coordinate values (X,Y,Z), the form (coordinate output form) in which the coordinate values should be output. In addition, the coordinate output form or output is controlled by combining the information of the detected coordinate values (X,Y,Z) and the information of the switch states of the coordinate input pen 4.

The operation of the coordinate input apparatus which implements the above operation will be described in detail with reference to FIG. 9.

Figure 9:
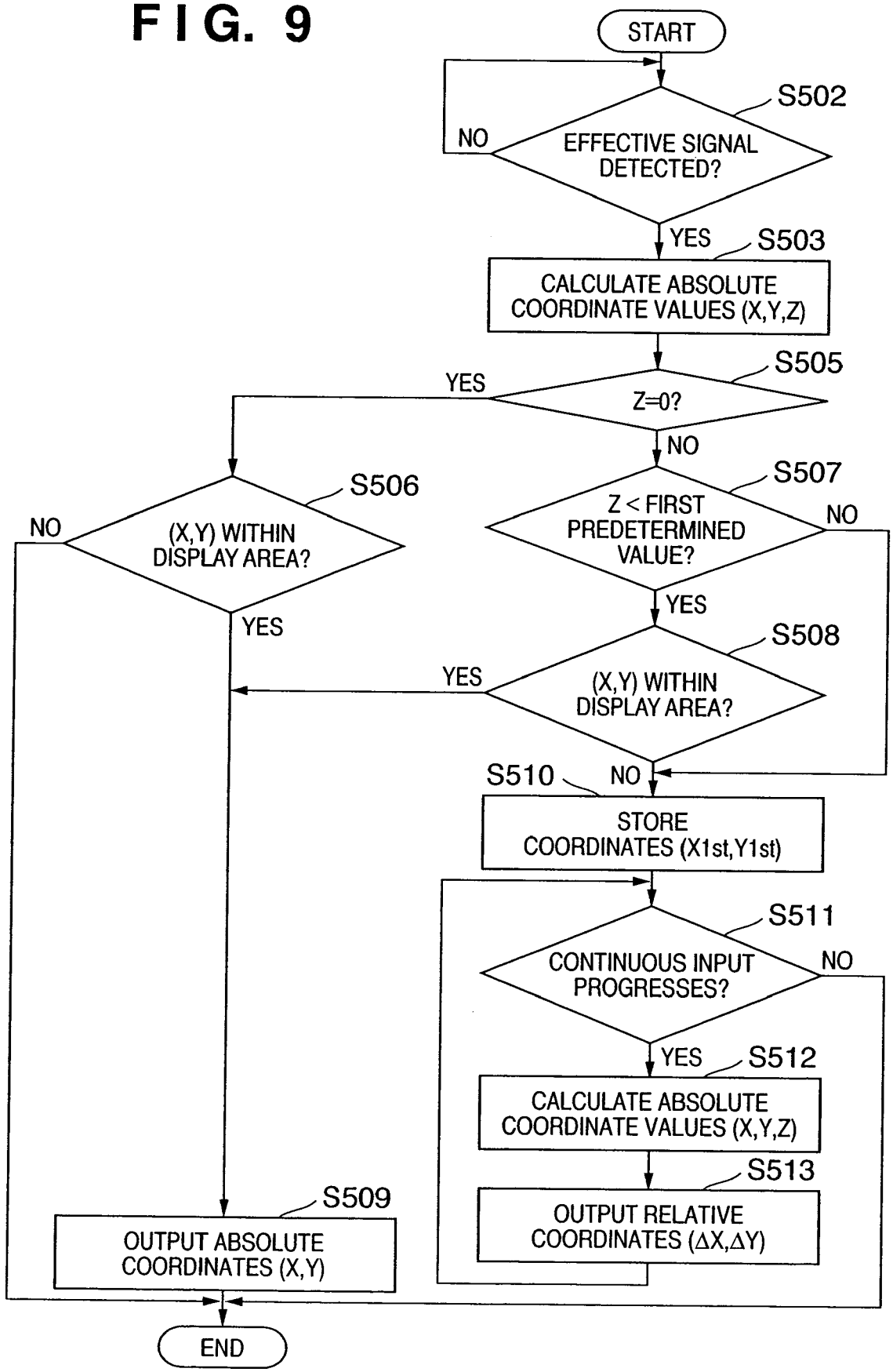
FIG. 9 is a flow chart for explaining the operation of the coordinate input apparatus according to the first embodiment of the present invention.

FIG. 9 is a flow chart for explaining the operation of the coordinate input apparatus according to the first embodiment of the present invention.

The flow chart shown in FIG. 9 operates on the basis of the operation mode shown in FIG. 8.

In step S502, it is determined whether an effective signal as information necessary for coordinate detection is detected (for example, it is determined whether the ultrasonic wave signal radiated from the coordinate input pen 4 is received by the detection sensor 3). If no effective signal is detected (NO in step S502), a standby state is set until an effective signal is detected. If an effective signal is detected (YES in step S502), the flow advances to step S503 to calculate the three-dimensional position coordinate values (X,Y,Z) (absolute coordinate values) of the coordinate input pen 4.

Next, in step S505, it is determined on the basis of the calculated coordinate values (X,Y,Z) whether the Z-axis value is 0 (Z=0), i.e., the coordinate input pen 4 is located on the coordinate input surface, and coordinates are input. When Z-coordinate value is 0 (YES in step S505), the flow advances to step S506 to determine the coordinate values (X,Y) fall within the display area of the display apparatus 6. When the calculated coordinate values (X,Y) fall within the display area (YES in step S506), the flow advances to step S509 to output the calculated coordinate values (X,Y) to an external device as specified values (absolute coordinate output form).

The information (the coordinate values of the display area) related to the display area is stored in the nonvolatile memory of the arithmetic control circuit 1 in advance.

When the calculated coordinate values (X,Y) fall outside the display area in step S506 (NO in step S506), it is determined that coordinates are input by some erroneous operation. Hence, output of the calculated coordinate values is stopped, and the processing is ended.

Although not directly illustrated in the flow chart of FIG. 8, for example, when the information of the pen point SW 41 of the coordinate input pen 4 is superposed on the optical signal as the start signal and demodulated by the control signal detection circuit 211 as a control signal, the reliability of coordinate calculation can be increased by using the information of the pen point SW 41.

That is, in then operative state of the pen point SW 41, the pen point SW 41 normally operates by pressing the display area as the coordinate input surface. If the Z-axis detection value is not 0 although the pen point SW 41 is operating, it is also determined that the coordinates are input by some erroneous operation, and output of the detected coordinate values can be stopped. A more reliable arrangement can be obtained from the viewpoint of preventing any erroneous operation (FIG. 8).

If Z-coordinate value≠0 in step S505 (NO in step S505), the flow advances to step S507 to determine whether the Z-coordinate value is smaller than the first predetermined value.

When the Z-coordinate value is equal to or larger than the first predetermined value (NO in step S507), the flow advances to step S510. When the Z-coordinate value is smaller than the first predetermined value (YES in step S507), it can be determined that the coordinate input pen 4 is located near or relatively near the display screen serving as the coordinate input surface. In step S508, it is determined whether the calculated coordinate values (X,Y) are within the display area.

When the calculated coordinate values (X,Y) are within the display area (YES in step S508), the flow advances to step S509 to directly output the calculated coordinate values (X,Y). In this state, the operator is operating the coordinate input pen 4 at a position relatively near the display screen. That is, the display information is controlled by moving the cursor or adding information of a character or graphic pattern as the coordinate input pen 4 is moved.

When the calculated coordinate values (X,Y) are outside the display area (NO in step S508), it can be supposed that the operator is doing presentation near the display screen at the side of the display area while controlling the displayed contents without hiding the display information for the listeners. The cursor can be relatively moved by operating the coordinate input pen 4.

The method of relatively moving the cursor will be continuously described. It can be determined that the operator is at a position relatively near the display apparatus 6 and is located at the side of the display apparatus 6. In step S510, at least the X- and Y-coordinate values of the calculated coordinate values (X,Y,Z) are stored in the nonvolatile memory of the arithmetic control circuit 1 as coordinate values (X1st,Y1st).

In step S511, it is determined whether coordinates are continuously input. The state "coordinates are continuously input" can be defined as follows. If a coordinate input apparatus of this type can output coordinates at 50 times/sec (coordinate calculation sampling rate), coordinates are output every 0.02 msec. When this period is measured, it can be determined whether the coordinates are continuously input.

In the coordinate input apparatus of the present invention, for example, the generation timing of the start signal (FIG. 4) of the control signal detection circuit 211 may be monitored (in this case, when the coordinate calculation sampling rate is 50 times/sec, the start signal is generated every 0.02 sec). Alternatively, the arrival interval of the ultrasonic wave signal (e.g., the signal 102 in FIG. 3) is directly monitored to determine whether coordinates are continuously input.

In the first embodiment, since the distance between the pointing tool 4 and the sensor 3 always changes in accordance with the movement of the coordinate input pen 4, the difference in sonic wave transmission time according to the change in distance is added/subtracted to/from the time (0.02 sec when the sampling rate is 50 times/sec) based on the sampling rate.

Hence, it is expressed as a period of "about 0.02 sec" (theoretically, a signal is always received within the range of 0 to 0.04 sec). In consideration of the maximum moving amount of the coordinate input pen 4 within 0.02 sec, when a signal can be received within, e.g., 0.03 sec, it is determined that coordinates are continuously input.

When coordinates are continuously input in step S511 (YES in step S511), the flow advances to step S512 to calculate the 3-dimensional position coordinates (X,Y,Z) of the coordinate input pen 4. In step S513, the differential coordinate values between the predetermined coordinate values (X1st,Y1st) stored in step S510 and the calculated coordinate values (X,Y,Z) are calculated to derive and output relative coordinate values (ΔX,ΔY) (relative coordinate output form). The flow returns to step S511 again to determine whether coordinates are continuously input. When coordinates are not continuously input (NO in step S511), the operation is ended.

At this time, to determine whether the output coordinate values are the absolute coordinate values (X,Y) or relative coordinate values (ΔX,ΔY), information representing it may be output together with the specified coordinate values.

In a coordinate input environment that aims at simplifying the coordinate input apparatus or requires no strict design specifications, processing in steps S505 to S508 may be omitted. The absolute coordinates or relative coordinates may be output on the basis of a state wherein the calculated coordinate values are within or outside the display area. In addition, the absolute coordinates or relative coordinates may be output in accordance with the operative state of the coordinate input pen 4. In this arrangement, the processing speed can be increased, or an inexpensive coordinate input apparatus can be formed.

A case wherein it is determined in step S507 that the coordinate values (X,Y,Z) calculated in step S502 are larger than the first predetermined value will be examined.

This state means that the coordinate input pen 4 is located at a position separated in the Z-axis direction from the display screen serving as the coordinate input surface. That is, it can be supposed that the operator who is doing presentation is considerably separated from the display apparatus 6, or a listener who is listening to the presentation has input coordinates. In other words, in this state, display information should be controlled or a character or graphic pattern should be added by remote control.

The state wherein the coordinate input position is separated from the screen will be examined. When the distance is relatively small (proximity input), the Z-axis direction value between the coordinate input pen 4 and the display apparatus 6 as the display screen is relatively small. When the coordinate input pen 4 is moved, for example, the displayed cursor can be intuitively and directly moved to a desired position. The positional shift of the cursor with respect to the desired position becomes large as compared to a case wherein coordinates are directly input to the display screen of the display apparatus 6 (when the pen point SW 41 is in the ON state), as a matter of course, though there is no practical problem at all.

However, as the distance from the display apparatus 6 increases (the Z-coordinate value becomes large), the positional shift between the cursor and the desired position becomes large, and the operator cannot intuitively directly indicate the desired position. More specifically, when the operator wants to move the cursor at a separate position, he/she inputs coordinates by operating the pen side SW of the coordinate input pen 4 while believing that he/she is indicating the desired position. However, the cursor position based on the obtained coordinate values is normally different from the above-described desired position.

Even when the operator indicates the desired position, the difference between the desired position and the position of the actually displayed cursor greatly increases as the distance from the display apparatus 6 increases (the Z-coordinate value becomes large). When the operator who is at a position separated from the display apparatus 6 should move the cursor to the desired position, first, coordinates are input to a position that can be supposed to be the desired position. Then, the operator must visually recognize the position of the cursor displayed on the basis of the coordinate value and then further move the coordinate input pen 4 toward the desired position, thereby gradually moving the cursor to the desired position.

In other words, in remote input (the operation of inputting coordinates at a position separated from the display apparatus 6 to, e.g., move the cursor), the correction operation of causing the operator to further move the pen to the desired direction on the basis of the visual information recognized by the operator is repeated (a loop that repeats visual recognition→operation→visual recognition), thereby attaining the object. The desired position cannot be directly indicated.

As described above, when the operator is to execute certain remote input operation for image information displayed on the display apparatus 6 (image information having a coordinate system on the X-Y plane), the coordinate values of the first point of the series coordinate input by the operator cannot coincide with the coordinate values of the above-described image information.

This can easily be understood from the following example. Laser pointers are popularly used as a tool that indicates a display image displayed by an OHP or the like. In this case as well, the operator cannot know what point is to be indicated by first laser emission and becomes able to irradiate a desired position with the laser beam by executing position correction operation while visually recognizing the indicated point position.

In the present invention, when the Z-coordinate value is equal to or larger than the first predetermined value in step S507 (remote input), the first effective coordinate values are stored as the predetermined coordinate values (X1st,Y1st) (at this time, the currently displayed cursor does not move). As the coordinate input pen 4 moves during the continuous input period, the cursor is moved in accordance with the direction and moving amount. With this operation, good operability is realized even in remote control.

The relationship between the display apparatus 6 and a coordinate input effective area will be described next with reference to FIG. 10.

Figure 10:
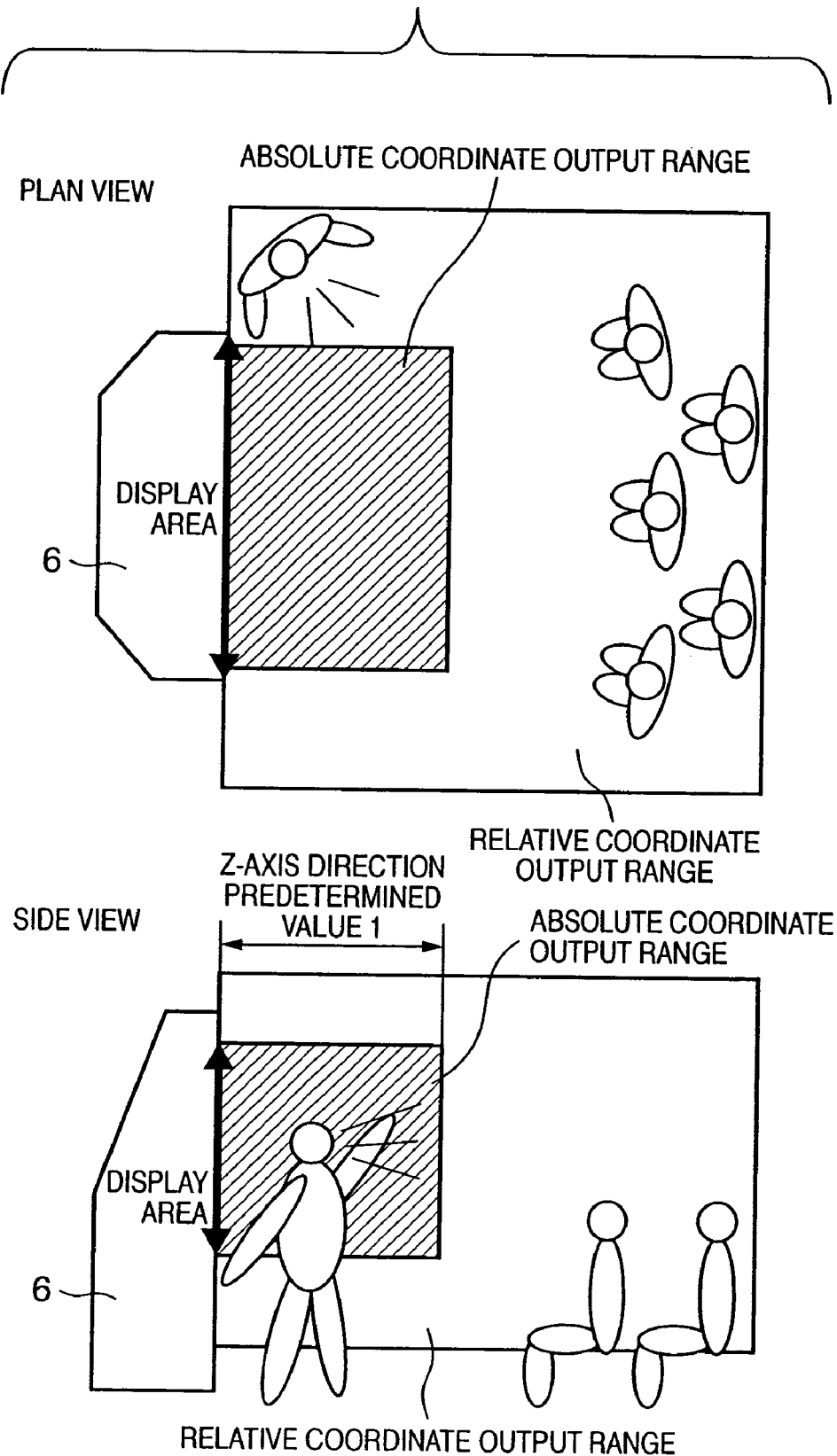
FIG. 10 is a view for explaining the relationship between the display apparatus and the coordinate input effective area according to the first embodiment of the present invention.

FIG. 10 is a view for explaining the relationship between the display apparatus and the coordinate input effective area according to the first embodiment of the present invention.

FIG. 10 shows the relationship between the display apparatus 6 and the coordinate input effective area and also shows the coordinate output form that is switched by the flow chart shown in FIG. 9.

Especially, FIG. 10 shows an arrangement in which when the operator is located at a position relatively close to the display area and the obtained coordinate values (X,Y) are within the display area, absolute coordinates are output (absolute coordinate output form) to directly input the coordinates, and when the operator is located at the side of the display apparatus 6 not to shield the visual field of the listeners or is executing remote control, relative coordinates are output (relative coordinate output form).

When the operator should input coordinates directly by touching the screen of a large display apparatus, he/she must always change his/her position to move the cursor from end to end of the screen.

In remote control, however, for example, a questioner normally stands up and asks a question at his/her position (when there are many listeners, movement is inevitably difficult). Hence, it is required to be able to indicate the entire area without moving.

The first embodiment also solves this problem. This will be described with reference to the drawing on the left side of FIG. 11. Assume that the operator is going to do presentation in front of many listeners in the relative coordinate output range (FIG. 10) by using the display apparatus 6 having a large screen.

Figure 11:
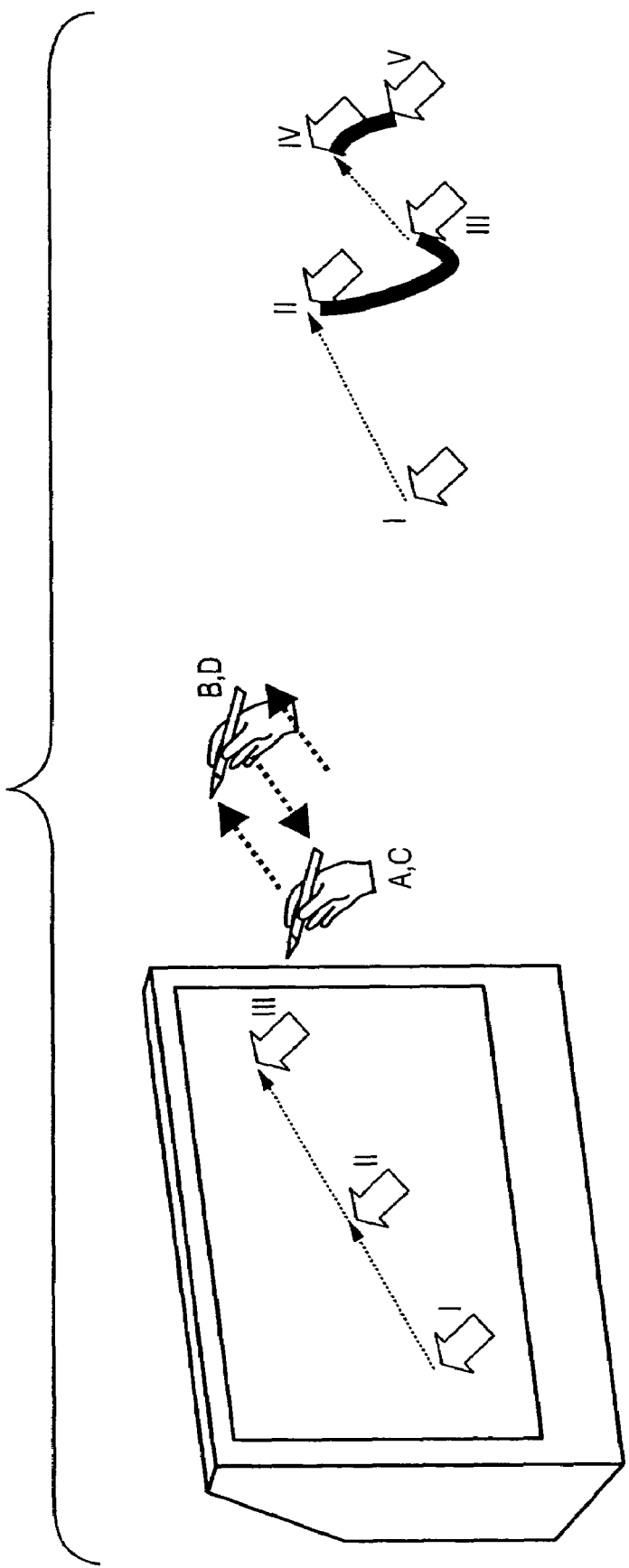
FIG. 11 is a view for explaining an operation example of the coordinate input pen according to the first embodiment of the present invention.

In the form in which absolute coordinates are output to directly input the coordinates (absolute coordinate output form), when the operator is to move the cursor from a position I to a position III in FIG. 11, he/she moves the coordinate input pen 4 to the position III and inputs coordinates. Accordingly, the cursor moves from the position I to the position III (in this case, the operator is at a position where he/she can indicate the position III).

However, when the operator works at the position I (the operator is near the position I) and then wants to move to the position III, he/she moves to cross the screen. Many of the listeners cannot obtain the information and hardly understand the contents of presentation. This problem is serious especially when the large display apparatus is a front projection apparatus or OHP (projection type display apparatus) because the image is largely distorted.

To the contrary, assume that the operator is at the side of the display apparatus 6, and the cursor is at the position I. The operator places the coordinate input pen 4 at a position A and operates at least one of the pen side SWs 42*a* and 42*b*. Accordingly, a sonic wave is radiated from the coordinate input pen 4, and the position coordinates of the coordinate input pen 4 are detected. At this time, the coordinate input pen 4 is outside the display area of the display screen or at a position separated from the display apparatus 6 (Z-coordinate value>first predetermined value). Hence, the position coordinates calculated first are stored (step S510 in FIG. 9), and the cursor does not move from the position I.

Assume that the operator continuously operates the pen side SW 42 to perform operation of continuously detecting coordinates, moves the coordinate input pen 4 to a position B, and turns off the pen side SW 42. As the operator moves the coordinate input pen 4 (moves the coordinate input pen from the position A to the position B), the cursor moves from the position I to the position II in an amount corresponding to the moving direction and moving distance.

The operator further moves the coordinate input pen 4 from the position B to a position C while keeping the pen side SW 42 in the OFF state (at this time, the cursor remains at the position II) and then moves the coordinate input pen 4 to a position D while operating at least one of the pen side SWs 42*a* and 42*b*. The pen side SW 42 operates, and the coordinate values detected first are stored again (step S510). After that, the cursor moves in an amount corresponding to the differential coordinate values between the detected coordinate values and the stored predetermined coordinate values (X1st,Y1st). As the operator moves the coordinate input pen 4 (moves the coordinate input pen from the position C to the position D), the cursor moves from the position II to the position III in an amount corresponding to the moving direction and moving distance.

As described above, even when the operator is located outside the display area serving as the input surface or at a position separated from the display apparatus 6, the cursor can be smoothly moved from the current position to the desired position. In addition, during a series of operations in which coordinates are continuously input, the X- and Y-direction moving amounts of the coordinate input pen 4 are in a one-to-one correspondence with the cursor moving amounts. Hence, a character or graphic pattern can be input.

A case wherein a character is to be input will be described with reference to the drawing on the right side of FIG. 11. First, the cursor is moved to a desired position (one of the pen side SWs 42a and 42b is operated, I→II: pen up state). After that, both of the pen side SWs 42a and 42b are operated to set the pen down state. A locus corresponding to the moving direction and moving amount of the pointing tool 4 remains on the screen as the pointing tool moves (II→III).

One of the pen side SWs 42a and 42b is turned off (the other pen side SW is still operating, and the state wherein coordinates are continuously calculated is maintained: pen up state). The cursor is moved to a desired position (III→IV). When the pen side SW in the OFF state is operated again, a locus is input again from the position of the cursor that has moved (IV→V).

The operator must move the cursor to the first position II by moving the coordinate input pen 4 while visually recognizing the cursor. However, he/she can input the character "い" in accordance with the absolute moving amount of the coordinate input pen 4, i.e., by intuitively moving the hand or arm without visually recognizing the cursor.

More specifically, when the first effective coordinate values during the continuous input period are used as a reference, coordinate values output during the continuous period have relative values. When viewed from the operator, the cursor moving amount corresponds to the movement of the hand or arm during that period. Hence, e.g., intuitive text input operation can be realized as if the coordinate input surface were present in the air.

As described above, the operator can control display information or add information of a character or graphic pattern by natural operation. In addition, many listeners can efficiently understand contents intended by the speaker, i.e., the operator because the display information is not hidden.

In consideration of the convenience of the system having the large screen, the absolute coordinate output form and the relative coordinate output form are automatically switched on the basis of calculated coordinate values. Since the operator need not to execute special operation (e.g., an operation of switching the output form of the coordinate input apparatus using a switch or the like) and can concentrate at presentation, an excellent operation environment can be provided.

In the relative coordinate output form, the predetermined coordinate values (X1st,Y1st) to obtain the difference from the calculated coordinate value are defined as the first effective coordinate values during the continuous input period.

The reason for this will be described in detail. It is easy for the operator near the display area to recognize the boundary of the display area. However, the recognition becomes vague as the distance from the display area becomes large. In addition, the first predetermined value in the Z-axis direction can be a numerical value that can be set by the operator. Even when the operator recognizes the numerical value, it is almost difficult to discriminate the actual boundary.

On the other hand, the operator can recognize by inputting the first coordinates whether the absolute coordinate output form or relative coordinate output form is being executed. This can easily be understood from, e.g., the relationship between the position of the coordinate input pen 4 and the position of the cursor.

However, if the operation is executed near the boundary where the coordinate output form should be changed, the coordinate output form switching operation is performed many times, resulting in difficulty in handling for the operator.

In the first embodiment, it is determined by monitoring the period of the start signal radiated from coordinate input pen 4 whether coordinates are being continuously input. The first effective coordinate values during the continuous input period are defined as reference coordinate value (predetermined coordinate values (X1st,Y1st)). During the continuous input period, differential coordinate values between the reference coordinate values and coordinate values calculated after that time are output.

Accordingly, as long as one of the pen side SWs 42a and 42b (or the pen point SW 41) is operating, the reference coordinate values are held. Even in a coordinate input operation near the coordinate output form switching area, the coordinate system for the operator and the coordinate output form are fixed during the continuous input period. Hence, a coordinate input apparatus with good operability can be constructed.

In other words, the operator can know the coordinate output form by inputting the coordinates of one point. While the coordinate input operation is continuously executed after that, the coordinate output form is fixed. Hence, the operator need not be aware of the boundary for coordinate output form switching after that.

In addition, the coordinate input apparatus according to the first embodiment can output coordinate values or coordinate output form information (information representing the absolute coordinate output form or relative coordinate output form) to an external device or the like. For a coordinate input apparatus which outputs only absolute coordinate values, the received coordinate values and the coordinate value reception timing (to determine whether coordinates are continuously input) are monitored on the side of an external device such as a personal computer that receives the output result, thereby implementing the processing as shown in FIG. 9. Even in this case, the same effect as described above can be obtained.

The coordinate input apparatus according to the first embodiment detects the position coordinates of a sonic wave generation source by using an ultrasonic wave. However, the present invention is not limited to this scheme. The present invention can also be applied to any other coordinate input method using an optical scheme or the like.

In the first embodiment, determination of the absolute coordinate output form or relative coordinate output form is done by determining, on the basis of calculated coordinate values, the distance from the display apparatus 6 and whether the coordinate input pen is in the display area of the display apparatus 6.

Hence, the range of the display area of the display apparatus 6 is preferably set on the coordinate system of the coordinate input apparatus. Especially, when a front projector is used as the display apparatus 6, the manner the apparatus is installed changes in each conference. When this point is taken into consideration, the display area is not always constant (the display size of the front projector depends on the projection distance). Hence, an arrangement for setting the display area is indispensable.

Even for a system having a fixed display screen (e.g., a rear projector or plasma display), an adjustment process that is disadvantageous from the viewpoint of cost is necessary at the time of assembly in order to make the coordinate system of the coordinate input apparatus coincide with that of the display apparatus. An arrangement capable of setting the display area after the coordinate input apparatus and display apparatus are combined is advantageous in terms of manufacturing.

As described above, even when the coordinate input apparatus outputs only absolute coordinates, and an external device such as a personal computer that receives the output from the coordinate input apparatus determines the operation mode, the display apparatus 6 is not always fixed. Hence, an arrangement for notifying the personal computer of the set display area is necessary.

Procedures for setting the display area will be described below with reference to FIG. 12.

Figure 12:
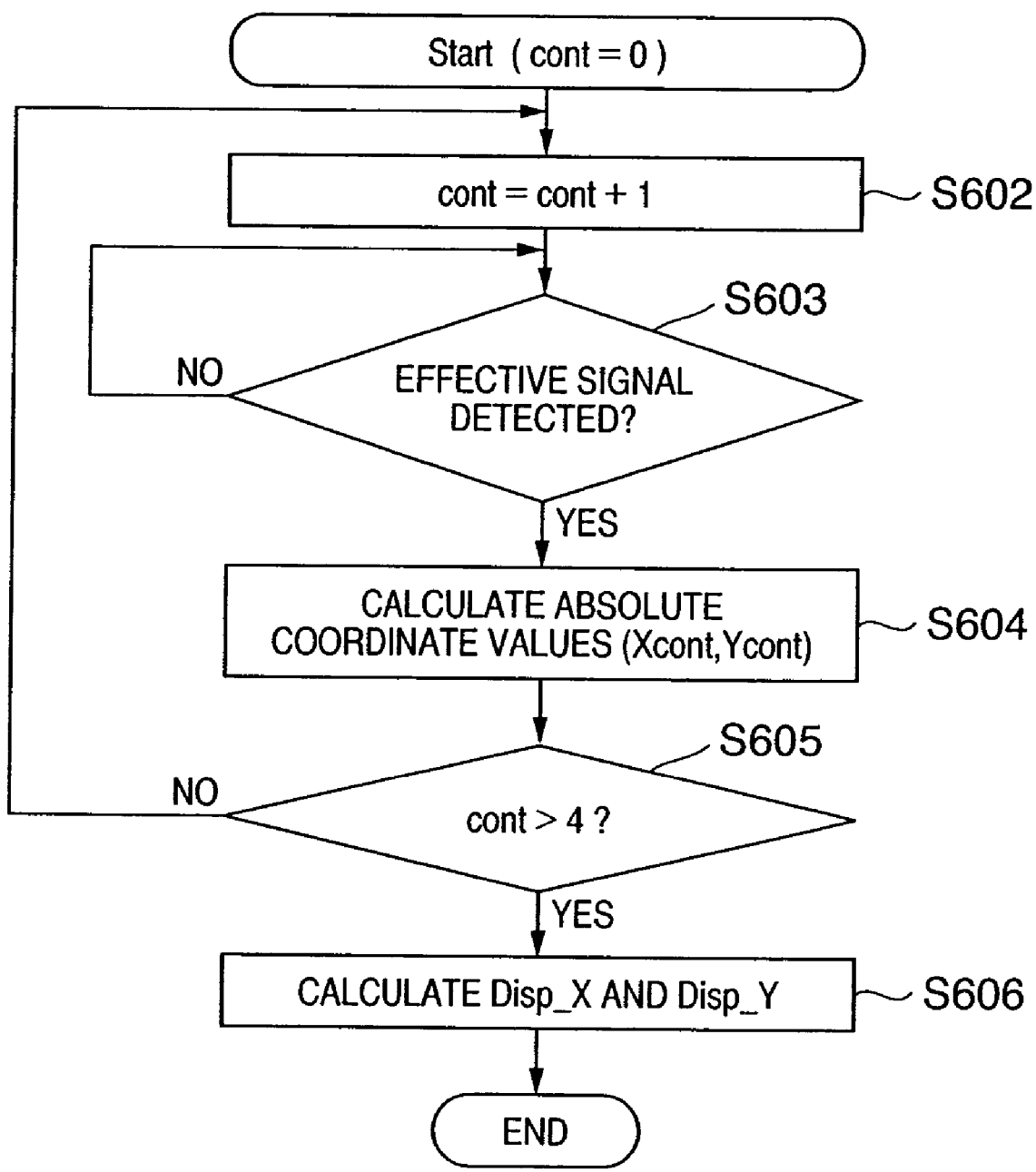
FIG. 12 is a flow chart showing display area setting processing of the coordinate input apparatus according to the first embodiment of the present invention.

FIG. 12 is a flow chart showing display area setting processing of the coordinate input apparatus according to the first embodiment of the present invention.

First, in step S602, a counter cont is set to 1. To detect the coordinate values of the four corner portions of the display area, a coordinate input operation by the coordinate input pen 4 for an arbitrary corner portion is started. In step S603, it is determined whether an effective signal is detected. When no effective signal is detected (NO in step S603), a standby state is set until an effective signal is detected. When an effective signal is detected (YES in step S603), the flow advances to step S604 to calculate absolute coordinate values (Xcont,Ycont).

In step S605, it is determined whether the value of the counter cont is larger than 4. When the value of the counter cont is equal to or smaller than 4 (NO in step S605), the flow returns to step S602 to increment the counter cont by one. When the value of the counter cont is larger than 4 (YES in step S605), the flow advances to step S606.

When the processing in steps S602 to S605 is repeated four times, the output coordinates of the four corner portions of the display area are obtained. These coordinate values are stored in the nonvolatile memory of the arithmetic control circuit 1.

In this way, the coordinate values of the four corner portions of the display area on the coordinate system of the coordinate input apparatus are obtained. For example, a value obtained by averaging the X-coordinate value at the upper left corner and that at the lower left corner can be defined as the boundary value in the X-direction on the left side. Alternatively, a rectangular area formed by connecting the four corner portions can be defined and used as conditions that determine the display area.

As a detailed example, in step S606, Disp_X and Disp_Y in FIG. 6 can be calculated as the conditions that determine the display area.

In this example, the coordinate values of the four corner portions of the display area of the display apparatus 6 are stored in the nonvolatile memory of the arithmetic control circuit 1, thereby deriving the display area. However, the present invention is not limited to this. For example, the display area may be derived from the coordinate values of three corner portions of the display apparatus 6. Alternatively, the coordinate values of four sides may be detected by tracing the boundary area, and the display area may be set from the information.

As described above, according to the first embodiment, the distance from the display apparatus 6 and whether the pointing tool is in or outside the set display area of the display apparatus 6 are determined on the basis of the position coordinates (X,Y,Z) of the coordinate input pen 4, thereby setting the coordinate output form (absolute coordinate output form or relative coordinate output form) of the coordinate input apparatus.

Accordingly, when the operator inputs coordinates by directly touching the input surface on the display screen, a character or graphic pattern is added to the display screen as if there were the relationship between paper and a pencil. In addition, by clicking or double-clicking on a predetermined icon displayed on the display screen, the display information or display apparatus 6 is controlled. For example, a personal computer can be caused to execute specific operation.

Even when the operator should perform the operation outside the display area or by remote control, the coordinate output form of the coordinate input apparatus is changed to make it possible to perform the same operation at a position separated from the display screen. The speaker, i.e., the operator can do effective presentation while concentrating at the contents of speech without being aware of switching of the coordinate output form. On the other hand, listeners can efficiently understand the contents of speech as well as the screen information because the operator does not hide the screen.

Even near the boundary area where the coordinate output form should be switched, the coordinate system and coordinate output form are fixed during continuous input operation. Hence, a coordinate input apparatus with good operability can be formed.

In addition, an arrangement for setting the display area of the display apparatus is prepared. Even in a system using a front projector whose display area changes in each conference, various effects as described above can be expected. Even in a system integrated with a display apparatus (e.g., a large display apparatus such as a rear projector or plasma display), the assembly step can be simplified, and an inexpensive apparatus can be implemented.

SECOND EMBODIMENT

The second embodiment is an application example of the first embodiment. An arrangement will be described in which when an operator is near the display screen, a magnification factor (enlargement factor) is set for calculated differential coordinate values to faithfully reproduce the moving direction and moving distance of a coordinate input pen 4 of the operator (e.g., reproduce the moving distance and direction of the cursor), thereby providing an operation environment with good operability.

The operation of a coordinate input apparatus having the above arrangement will be described below with reference to FIG. 13.

Figure 13:
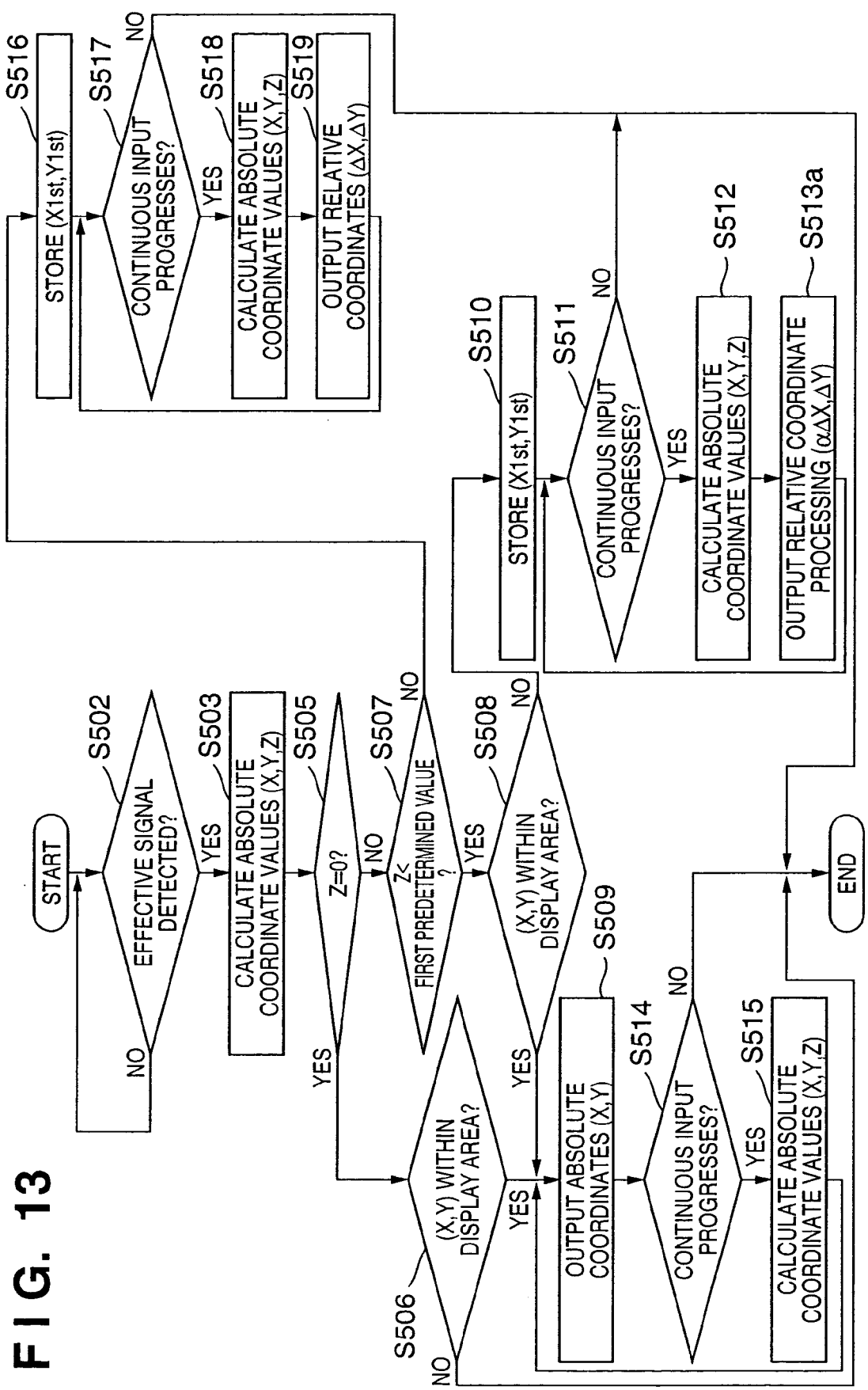
FIG. 13 is a flow chart for explaining the operation of a coordinate input apparatus according to the second embodiment of the present invention.

FIG. 13 is a flow chart for explaining the operation of the coordinate input apparatus according to the second embodiment of the present invention.

The same step numbers as in the flow chart shown in FIG. 9 of the first embodiment denote the same processes in the flow chart shown in FIG. 13 of the second embodiment, and a detailed description thereof will be omitted.

In step S514, it is determined whether coordinates are continuously input. When coordinates are not continuously input (NO in step S514), the processing is ended. When coordinates are continuously input (YES in step S514), the flow advances to step S515 to calculate the three-dimensional coordinate values (X,Y,Z) of the coordinate input pen 4. In step S509, at least the coordinate values (X,Y) of the calculated coordinate values (X,Y,Z) are directly output as specified values (absolute coordinate output form).

When coordinates are continuously input instep S511 (YES in step S511), the flow advances to step S512 to calculate the three-dimensional position coordinates (X,Y,Z) of the coordinate input pen 4. In step S513$a$, the differential coordinate values from predetermined coordinate values (X1st,Y1st) stored in step S510 are calculated. In addition, the differential coordinate value of the X-axis as the horizontal axis of the display screen is multiplied by an enlargement factor $\alpha$ to derive and output relative coordinate values ($\alpha\Delta X,\Delta Y$) (relative coordinate processing output form). Then, the flow returns to step S511.

The function/effect of multiplication of the enlargement factor $\alpha$ and details of the method of setting the enlargement factor $\alpha$ will be described later.

In the second embodiment, when the Z-coordinate value is equal to or larger than the first predetermined value in step S507 (remote input), the first effective coordinate values are stored as the predetermined coordinate values (X1st,Y1st) in step S516 (at this time, the currently displayed cursor does not move). As the coordinate input pen 4 moves during the continuous input period, the cursor is moved in correspondence with the moving direction and distance of the coordinate input pen. Even in remote control, good operability can be realized.

This is the routine in steps S517 to S519 (corresponding to the routine in steps S510 to S513 in FIG. 9 of the first embodiment). The calculated differential coordinate values are directly output. This step is different from step S513$a$ because the calculated differential coordinate values described above are not multiplied by the predetermined enlargement factor $\alpha$.

With this arrangement, the coordinate output form is automatically determined on the basis of the detected coordinate values in accordance with the use situation of the operator. In addition, while coordinates are continuously detected, the coordinate output form does not switch. Hence, an operation environment convenient for the operator can be provided.

To discriminate whether the output coordinate values are the absolute coordinate values (X,Y,Z), ($\alpha\Delta X,\Delta Y$), or the relative coordinate values ($\Delta X,\Delta Y$), information representing it may be output together with the specified coordinate values.

The function/effect of setting the enlargement factor $\alpha$ in step S513 of FIG. 13 will be described next with reference to FIG. 14.

Referring to FIG. 13, when the operator is operating the pointing tool 4 near the display apparatus 6 serving as the coordinate input surface outside the display area, the following condition is necessary for moving the cursor in accordance with the moving direction and the moving distance of the coordinate input pen 4. That is, a virtual coordinate input surface (as if the operator supposed an operation plane in the space and moved the pointing tool 4 in the plane) supposed by the operator must be parallel to the display area (i.e., the X-Y plane of the coordinate input apparatus and the virtual coordinate input surface supposed by the operator are parallel), as shown on the left side of FIG. 14.

Figure 14:
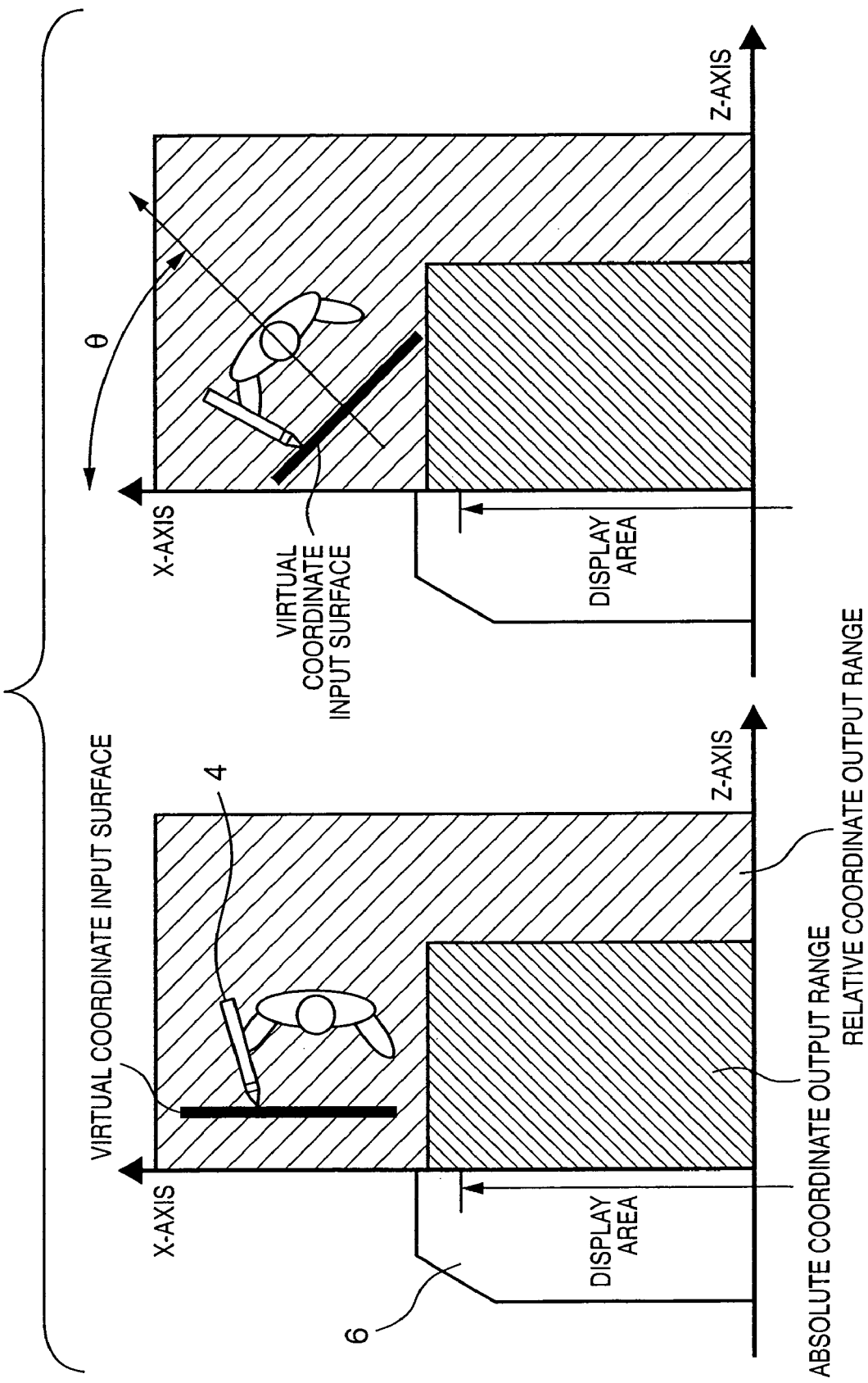
FIG. 14 is a view for explaining an operation example of a coordinate input pen according to the second embodiment of the present invention.

On the other hand, when the virtual coordinate input surface is not parallel to the display area, as shown on the right side of FIG. 14, the moving amount in the X-axis direction becomes small as compared to the moving amount of the coordinate input pen 4 (an X-axis moving amount X' on the virtual coordinate input surface of the operator and an X-axis moving amount X* of the cursor on the display screen have a relation X*=X'sin$\Theta$). When the operator wants to control display information near the display screen, he/she operates while looking at the display screen. When the operator should suppose a virtual coordinate input surface, he/she generally supposes the state shown on the right side of FIG. 14 then the state shown on the left side of FIG. 14. The operability is better in this state.

In the second embodiment, if it is determined that the operator is located near the display screen (steps S510 to S513$a$ in FIG. 13), the differential coordinate value in the X-axis direction corresponding to the horizontal direction of the display screen is multiplied by the predetermined enlargement factor $\alpha$ to move the cursor. Accordingly, the cursor can reproduce its movement more faithfully in accordance with the moving amount and direction of the coordinate input pen 4.

The angle $\Theta$ made by the virtual coordinate input surface supposed by the operator and the X-Y plane of the coordinate input apparatus will be examined next.

The operator operates the coordinate input pen 4 to display desired information or add information while always looking at the display area. For this reason, the angle $\Theta$ is almost determined by the direction of the operator. When the viewing angle of the display apparatus 6 is taken into consideration, the value of the angle $\Theta$ is at least about 30°. The angle becomes large as the distance from the display area increases.

In the second embodiment, the state in steps S516 to S519 in FIG. 13 means that the operator is located at a position sufficiently separated from the display area and can hardly move the cursor directly to a desired position, as described above. In this area, the operator moves the coordinate input pen 4 while sequentially visually recognizing the movement of the cursor, thereby moving the cursor to the desired position.

In this area, if the position of the coordinate input pen 4 falls within the display area, the virtual coordinate input surface set by the operator should be parallel to the display area. Even when the position of the coordinate input pen 4 is outside the display area, the angle $\Theta$ is almost 90° (the two surfaces are almost parallel). Hence, in this area, the enlargement factor $\alpha$ is not set.

Figure 15:
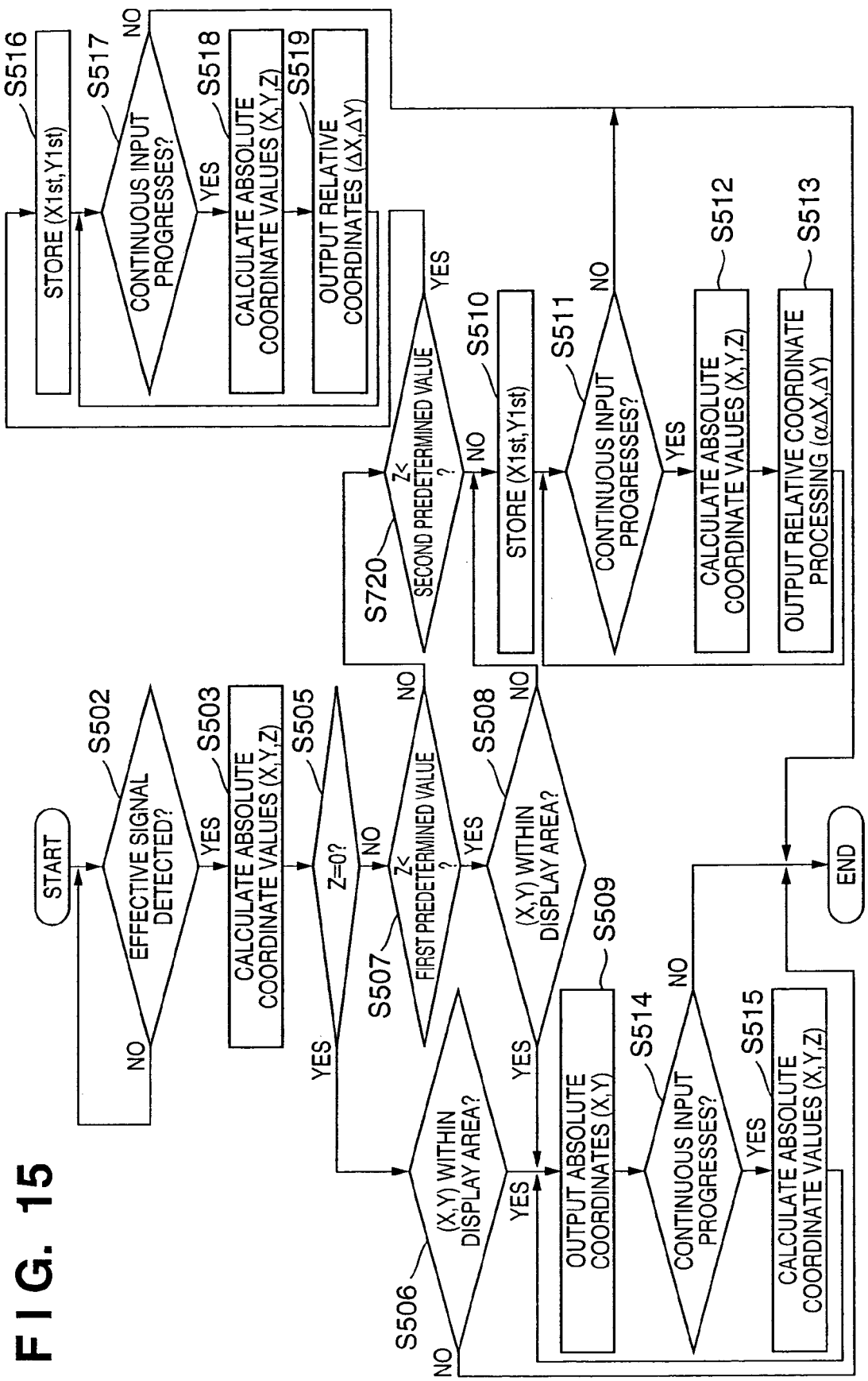
FIG. 15 is a flow chart for explaining another operation of the coordinate input apparatus according to the second embodiment of the present invention.

To more faithfully reproduce the movement of the cursor according to the movement of the coordinate input pen 4, step S720 is added to the flow chart shown in FIG. 13, as shown in FIG. 15, to execute determination based on the second predetermined value. The area is divided into an area relatively close to the display screen (Z<first predetermined value), an area sufficiently separated from the display screen (Z>second predetermined value), and an intermediate area. In the close area (Z<first predetermined value) and intermediate area (first predetermined value<Z<second predetermined value), the set value of the enlargement factor is changed. In the close area, the angle $\Theta$ made by the virtual coordinate input surface tends to be large. Hence, the enlargement factor $\alpha$ in the close area may be made large.

The enlargement factor may be automatically set using the Z-coordinate value (the distance from the display screen) of the calculated coordinate values (X,Y,Z). The enlargement factor may be automatically set by obtaining the angle made by the X-Y plane and a line segment that connects the calculated coordinate values (X,Y,Z) and the coordinate origin (FIG. 6). The operator may set a desired enlargement factor using an application.

As described above, the operator can control display information or add information of a character or graphic pattern by natural operation. In addition, many listeners can efficiently understand contents intended by the speaker, i.e., the operator because the display information is not hidden.

Even when the operation is executed in the absolute coordinate output form (step S509), an operation of indicating the range of the relative coordinate output form (step S519) or the relative coordinate processing output form (step S513a) wherein relative coordinates are processed and output may be performed at a high probability.

For example, when absolute coordinates are detected in an area close to the first predetermined value in the Z-axis direction, and the value in the Z-axis direction exceeds the first predetermined value during the operation, any change of the coordinate system undesirably confuses the operator because he/she is executing a series of operations.

However, as in the second embodiment, when absolute coordinates are always output independently of the Z-axis value during the continuous period when the absolute coordinates are output, the operator can concentrate at the operation without being aware of the boundary.

The coordinate input apparatus according to the second embodiment discloses an arrangement which outputs coordinate values or coordinate output form information (information representing the absolute coordinate output form, relative coordinate output form, or relative coordinate processing output form) to an external device or the like. For a coordinate input apparatus which output only absolute coordinate values, the received coordinate values and the coordinate value reception timing (to determine whether coordinates are continuously input) are monitored on the side of an external device such as a personal computer that receives the output result, thereby implementing the processing as shown in FIG. 13. Even in this case, the same effect as described above can be obtained.

In the second embodiment, determination of the absolute coordinate output form, relative coordinate output form, or relative coordinate processing output form is done by determining, on the basis of calculated coordinate values, the distance from the display apparatus 6 and whether the coordinate input pen is in the display area of the display apparatus 6.

As described above, even when the coordinate input apparatus outputs only absolute coordinates, and an external device such as a personal computer that receives the output from the coordinate input apparatus determines the operation mode, the display apparatus 6 is not always fixed. Hence, an arrangement for notifying the personal computer of the set display area is necessary. The display area setting can be realized by using the flow chart shown in FIG. 12 of the first embodiment.

As described above, according to the second embodiment, the distance from the display apparatus 6 and whether the coordinate input pen is in or outside the set display area of the display apparatus 6 are determined on the basis of the position coordinates (X,Y,Z) of the coordinate input pen 4, thereby setting the coordinate output form (the absolute coordinate output form, relative coordinate output from, or relative coordinate processing output form) of the coordinate input apparatus.

In addition to the effect described in the first embodiment, when the operator is near the display screen, an enlargement factor is set for the calculated differential coordinate values. With this arrangement, the moving direction and moving distance of the coordinate input pen 4 of the operator can be faithfully reproduced (e.g., the moving distance and direction of the cursor are reproduced), so an operation environment with good operability can be provided.

The embodiments have been described above in detail. The present invention may be applied to a system constituted by a plurality of devices or an apparatus comprising a single device.

The present invention also incorporates a case wherein its object is achieved by supplying a software program (a program corresponding to the flow charts illustrated in the embodiments) which implements the functions of the above-described embodiments to the system or apparatus directly or from a remote site and causing the computer of the system or apparatus to read out and execute the supplied program codes.

The program codes installed in the computer to implement the functional processing of the present invention also implements the present invention by themselves. That is, the present invention also incorporates the computer program which implements the functional processing of the present invention.

In this case, the program can employ any form such as an object code, a program executed by an interpreter, or script data to be supplied to an OS as far as the functions of the program can be obtained.

As the recording medium for supplying the program, for example, a floppy disk (registered trademark), hard disk, optical disk, magnetooptical disk, MO, CD-ROM, CD-R, CD-RW, magnetic tape, nonvolatile memory card, ROM, DVD (DVD-ROM or DVD-R), or the like can be used.

As another program supply method, a client computer may be connected to a homepage on the Internet using a browser, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus which detects position coordinates of a coordinate input pointing tool, comprising:
    calculation means for calculating position coordinates in a space defined by first to third axes of the coordinate input pointing tool;
    comparison means for comparing a value of the first axis of the coordinate values calculated by the calculation means with a predetermined value;
    determination means for determining whether the coordinate values of the second and third axes of the coordinate values calculated by the calculation means fall within a predetermined range; and
    output means for outputting the coordinate values calculated by the calculation means in a coordinate output form determined on the basis of a comparison result by the comparison means and a determination result by the determination means,
    wherein the coordinate output form includes at least
    an absolute coordinate output form in which the calculated coordinate values are directly output, and
    a relative coordinate output form in which differential values between the calculated coordinate values and predetermined coordinate values are output,
    wherein the predetermined coordinate values are first effective coordinate values during a continuous input period in which coordinate input is continuously executed, and
    the apparatus further comprises storage means for storing the first effective position coordinates calculated by said calculation means during the continuous input period as the predetermined coordinate values.

2. A coordinate input apparatus which detects position coordinates of a coordinate input pointing tool, comprising:
    calculation means for calculating position coordinates in a space defined by first to third axes of the coordinate input pointing tool;
    comparison means for comparing a value of the first axis of the coordinate values calculated by the calculation means with a predetermined value;
    determination means for determining whether the coordinate values of the second and third axes of the coordinate values calculated by the calculation means fall within a predetermined range; and
    output means for outputting the coordinate values calculated by the calculation means in a coordinate output form determined on the basis of a comparison result by the comparison means and a determination result by the determination means,
    wherein the coordinate output form includes at least
    an absolute coordinate output form in which the calculated coordinate values are directly output, and
    a relative coordinate output form in which differential values between the calculated coordinate values and predetermined coordinate values are output,
    wherein a display apparatus overlaps the coordinate input apparatus, and
    the first axis defines a normal direction to a display area plane of the display apparatus, and the second and third axes define the display area plane of the display apparatus.

3. A coordinate input apparatus which detects position coordinates of a coordinate input pointing tool, comprising:
    calculation means for calculating position coordinates in a space defined by first to third axes of the coordinate input pointing tool;
    comparison means for comparing a value of the first axis of the coordinate values calculated by the calculation means with a predetermined value;
    determination means for determining whether the coordinate values of the second and third axes of the coordinate values calculated by the calculation means fall within a predetermined range; and
    output means for outputting the coordinate values calculated by the calculation means in a coordinate output form determined on the basis of a comparison result by the comparison means and a determination result by the determination means,
    wherein the coordinate output form includes at least
    an absolute coordinate output form in which the calculated coordinate values are directly output, and
    a relative coordinate output form in which differential values between the calculated coordinate values and predetermined coordinate values are output,
    wherein the coordinate output form further includes a relative coordinate processing output form in which at least a differential coordinate value between the coordinate value of the second axis and the predetermined coordinate value is multiplied and output.

4. The apparatus according to claim 3, wherein
    the apparatus further comprises a display apparatus which is overlapped on the coordinate input apparatus, and
    the first axis defines a normal direction to a display area plane of the display apparatus, the second axis defines a horizontal direction of the display area plane of the display apparatus, and the third axis defines a vertical direction of the display area plane of the display apparatus.

5. The apparatus according to claim 3, wherein a magnification factor of the multiplication of the differential coordinate value in the relative coordinate processing output form is set on the basis of the coordinate value of the first axis.

6. The apparatus according to claim 3, wherein a magnification factor of the multiplication of the differential coordinate value in the relative coordinate processing output form is set on the basis of the position coordinates.

7. A coordinate input apparatus which detects position coordinates of a coordinate input pointing tool and displays information based on the position coordinates on a display apparatus, comprising:
    calculation means for calculating the position coordinates of the coordinate input pointing tool;
    determination means for determining whether the position coordinates calculated by said calculation means fall within a display area of the display apparatus;
    determination means for determining on the basis of a determination result whether the position coordinates or differential coordinate values between the position coordinates and predetermined coordinates should be output; and
    setting means for setting the display area of the display apparatus,
    wherein the apparatus further comprises switch state determination means for determining operative states of a plurality of switches of the coordinate input pointing tool, and coordinate output control means for outputting the position coordinates or the differential coordinate values between the position coordinates and the predetermined coordinates or inhibits output of the position coordinates on the basis of the determination result of said determination means and a determination result of said switch state determination means.

8. The apparatus according to claim 7, wherein said setting means sets the display area on the basis of coordinate values of at least three display area corner portions of the display area.

9. A coordinate input apparatus which detects position coordinates of a coordinate input pointing tool and displays information based on the position coordinates on a display apparatus, comprising:
  calculation means for calculating the position coordinates of the coordinate input pointing tool;
  determination means for determining whether the position coordinates calculated by said calculation means fall within a display area of the display apparatus;
  determination means for determining on the basis of a determination result whether the position coordinates or differential coordinate values between the position coordinates and predetermined coordinates should be output; and
  setting means for setting the display area of the display apparatus,
  wherein the predetermined coordinates are first effective coordinate values during a continuous input period in which coordinate input is continuously executed, and
  the apparatus further comprises storage means for storing the first effective position coordinates calculated by said calculation means during the continuous input period as the predetermined coordinates.

10. The apparatus according to claim 9, wherein said setting means sets the display area on the basis of coordinate values of at least three display area corner portions of the display area.

11. A method for a coordinate input apparatus for detecting position coordinates of a coordinate input pointing tool, the method comprising:
  a calculation step of calculating position coordinates in a space defined by first to third axes of the coordinate input pointing tool;
  a comparison step of comparing a value of the first axis of the coordinate values calculated in the calculation step with a predetermined value;
  a determination step of determining whether the coordinate values of the second and third axes of the coordinate values calculated in the calculation step fall within a predetermined range; and
  an output step of outputting the coordinate values calculated in the calculation step in a coordinate output form determined on the basis of a comparison result in the comparison step and a determination result in the determination step,
  wherein the coordinate output form includes at least
  an absolute coordinate output form in which the calculated coordinate values are directly output, and
  a relative coordinate output form in which differential values between the calculated coordinate values and predetermined coordinate values are output,
  wherein the predetermined coordinate values are first effective coordinate values during a continuous input period in which coordinate input is continuously executed, and the method further comprises a storage step for storing the first effective position coordinates calculated in said calculation step during the continuous input period as the predetermined coordinate values.

12. A method for a coordinate input apparatus for detecting position coordinates of a coordinate input pointing tool, the method comprising:
  a calculation step of calculating position coordinates in a space defined by first to third axes of the coordinate input pointing tool;
  a comparison step of comparing a value of the first axis of the coordinate values calculated in the calculation step with a predetermined value;
  a determination step of determining whether the coordinate values of the second and third axes of the coordinate values calculated in the calculation step fall within a predetermined range; and
  an output step of outputting the coordinate values calculated in the calculation step in a coordinate output form determined on the basis of a comparison result in the comparison step and a determination result in the determination step,
  wherein the coordinate output form includes at least
  an absolute coordinate output form in which the calculated coordinate values are directly output, and
  a relative coordinate output form in which differential values between the calculated coordinate values and predetermined coordinate values are output,
  wherein a display apparatus overlaps the coordinate input apparatus, and
  the first axis defines a normal direction to a display area plane of the display apparatus, and the second and third axes define the display area plane of the display apparatus.

13. A method for a coordinate input apparatus for detecting position coordinates of a coordinate input pointing tool, the method comprising:
  a calculation step of calculating position coordinates in a space defined by first to third axes of the coordinate input pointing tool;
  a comparison step of comparing a value of the first axis of the coordinate values calculated in the calculation step with a predetermined value;
  a determination step of determining whether the coordinate values of the second and third axes of the coordinate values calculated in the calculation step fall within a predetermined range; and
  an output step of outputting the coordinate values calculated in the calculation step in a coordinate output form determined on the basis of a comparison result in the comparison step and a determination result in the determination step,
  wherein the coordinate output form includes at least
  an absolute coordinate output form in which the calculated coordinate values are directly output, and
  a relative coordinate output form in which differential values between the calculated coordinate values and predetermined coordinate values are output,
  wherein the coordinate output form further includes a relative coordinate processing output form in which at least a differential coordinate value between the coordinate value of the second axis and the predetermined coordinate value is multiplied and output.

14. A method for a coordinate input apparatus for detecting position coordinates of a coordinate input pointing tool and displaying information based on the position coordinates on a display apparatus, the method comprising:

a calculation step of calculating the position coordinates of the coordinate input pointing tool;

a determination step of determining whether the position coordinates calculated in said calculation step fall within a display area of the display apparatus;

a determination step of determining on the basis of a determination result whether the position coordinates or differential coordinate values between the position coordinates and predetermined coordinates should be output; and a setting step of setting the display area of the display apparatus, wherein the method further comprises a switch state determination step of determining operative states of a plurality of switches of the coordinate input pointing tool, and a coordinate output control step of outputting the position coordinates or the differential coordinate values between the position coordinates and the predetermined coordinates or inhibits output of the position coordinates on the basis of the determination result of said determination step and a determination result of said switch state determination step.

15. A method for a coordinate input apparatus for detecting position coordinates of a coordinate input pointing tool and displaying information based on the position coordinates on a display apparatus, the method comprising:

a calculation step of calculating the position coordinates of the coordinate input pointing tool;

a determination step of determining whether the position coordinates calculated in said calculation step fall within a display area of the display apparatus;

a determination step of determining on the basis of a determination result whether the position coordinates or differential coordinate values between the position coordinates and predetermined coordinates should be output; and a setting step of setting the display area of the display apparatus, wherein the predetermined coordinates are first effective coordinate values during a continuous input period in which coordinate input is continuously executed, and the method further comprises a storage step of storing the first effective position coordinates calculated in said calculation step during the continuous input period as the predetermined coordinates.

16. A computer-executable program stored on a computer-readable medium, the program for a coordinate input apparatus for detecting position coordinates of a coordinate input pointing tool, the program comprising code for:

a calculation step of calculating position coordinates in a space defined by first to third axes of the coordinate input pointing tool;

a comparison step of comparing a value of the first axis of the coordinate values calculated in the calculation step with a predetermined value;

a determination step of determining whether the coordinate values of the second and third axes of the coordinate values calculated in the calculation step fall within a predetermined range; and an output step of outputting the coordinate values calculated in the calculation step in a coordinate output form determined on the basis of a comparison result in the comparison step and a determination result in the determination step, wherein the coordinate output form includes at least an absolute coordinate output form in which the calculated coordinate values are directly output, and a relative coordinate output form in which differential values between the calculated coordinate values and predetermined coordinate values are output, wherein the predetermined coordinate values are first effective coordinate values during a continuous input period in which coordinate input is continuously executed, and the program further comprises code for a storage step for storing the first effective position coordinates calculated in said calculation step during the continuous input period as the predetermined coordinate values.

17. A computer-executable program stored on a computer-readable medium, the program for a coordinate input apparatus for detecting position coordinates of a coordinate input pointing tool, the program comprising code for:

a calculation step of calculating position coordinates in a space defined by first to third axes of the coordinate input pointing tool;

a comparison step of comparing a value of the first axis of the coordinate values calculated in the calculation step with a predetermined value;

a determination step of determining whether the coordinate values of the second and third axes of the coordinate values calculated in the calculation step fall within a predetermined range; and an output step of outputting the coordinate values calculated in the calculation step in a coordinate output form determined on the basis of a comparison result in the comparison step and a determination result in the determination step, wherein the coordinate output form includes at least an absolute coordinate output form in which the calculated coordinate values are directly output, and a relative coordinate output form in which differential values between the calculated coordinate values and predetermined coordinate values are output, wherein a display apparatus overlaps the coordinate input apparatus, and the first axis defines a normal direction to a display area plane of the display apparatus, and the second and third axes define the display area plane of the display apparatus.

18. A computer-executable program stored on a computer-readable medium, the program for a coordinate input apparatus for detecting position coordinates of a coordinate input pointing tool, the program comprising code for:

a calculation step of calculating position coordinates in a space defined by first to third axes of the coordinate input pointing tool;

a comparison step of comparing a value of the first axis of the coordinate values calculated in the calculation step with a predetermined value;

a determination step of determining whether the coordinate values of the second and third axes of the coordinate values calculated in the calculation step fall within a predetermined range; and an output step of outputting the coordinate values calculated in the calculation step in a coordinate output form determined on the basis of a comparison result in the comparison step and a determination result in the determination step, wherein the coordinate output form includes at least an absolute coordinate output form in which the calculated coordinate values are directly output, and a relative coordinate output form in which differential values between the calculated coordinate values and predetermined coordinate values are output, wherein the coordinate output form further includes a relative coordinate processing output form in which at least a differential coordinate value between the coordinate value of the second axis and the predetermined coordinate value is multiplied and output.

19. A computer-executable program stored on a computer-readable medium, the program for a coordinate input apparatus for detecting position coordinates of a coordinate input pointing tool and displaying information based on the position coordinates on a display apparatus, the program comprising code for:

a calculation step of calculating the position coordinates of the coordinate input pointing tool;

a determination step of determining whether the position coordinates calculated in said calculation step fall within a display area of the display apparatus;

a determination step of determining on the basis of a determination result whether the position coordinates or differential coordinate values between the position coordinates and predetermined coordinates should be output; and a setting step of setting the display area of the display apparatus, wherein the program further comprises code for a switch state determination step of determining operative states of a plurality of switches of the coordinate input pointing tool, and a coordinate output control step of outputting the position coordinates or the differential coordinate values between the position coordinates and the predetermined coordinates or inhibits output of the position coordinates on the basis of the determination result of said determination step and a determination result of said switch state determination step.

20. A computer-executable program stored on a computer-readable medium, the program for a coordinate input apparatus for detecting position coordinates of a coordinate input pointing tool and displaying information based on the position coordinates on a display apparatus, the program comprising code for:

a calculation step of calculating the position coordinates of the coordinate input pointing tool;

a determination step of determining whether the position coordinates calculated in said calculation step fall within a display area of the display apparatus;

a determination step of determining on the basis of a determination result whether the position coordinates or differential coordinate values between the position coordinates and predetermined coordinates should be output; and a setting step of setting the display area of the display apparatus, wherein the predetermined coordinates are first effective coordinate values during a continuous input period in which coordinate input is continuously executed, and the program further comprises code for a storage step of storing the first effective position coordinates calculated in said calculation step during the continuous input period as the predetermined coordinates.

* * * * *

UNITED STATES PATENT AND TRADEMARK OFFICE
CERTIFICATE OF CORRECTION

| | | |
|---|---|---|
| PATENT NO. | : 7,075,524 B2 | |
| APPLICATION NO. | : 10/620573 | |
| DATED | : July 11, 2006 | |
| INVENTOR(S) | : Katsuyuki Kobayashi et al. | |

It is certified that error appears in the above-identified patent and that said Letters Patent is hereby corrected as shown below:

COVER PAGE:
(56) References Cited, U.S. PATENT DOCUMENTS
"6,900,791 B1" should read -- 6,900,791 B2 --.

COLUMN 4:
Line 12, "comprising;" should read -- comprising: --.

COLUMN 5:
Lines 2, 36 and 59, "comprising;" should read -- comprising: --.

COLUMN 6:
Lines 5 and 29, "comprising;" should read -- comprising: --.

COLUMN 11:
Line 37, "corresponding" should read -- corresponding to --; and
Line 43, "examples," should read -- example, --.

COLUMN 14:
Line 19, "being" should be deleted.

COLUMN 17:
Line 1, "then" should read -- the --.

COLUMN 25:
Line 8, "instep" should read -- in step --.

UNITED STATES PATENT AND TRADEMARK OFFICE
CERTIFICATE OF CORRECTION

PATENT NO. : 7,075,524 B2
APPLICATION NO. : 10/620573
DATED : July 11, 2006
INVENTOR(S) : Katsuyuki Kobayashi et al.

It is certified that error appears in the above-identified patent and that said Letters Patent is hereby corrected as shown below:

COLUMN 27:
Line 33, "output" should read -- outputs --; and
Line 63, "from," should read -- form, --.

Signed and Sealed this

Twenty-sixth Day of February, 2008

JON W. DUDAS
*Director of the United States Patent and Trademark Office*